(12) United States Patent
Snyder

(10) Patent No.: US 9,802,355 B2
(45) Date of Patent: *Oct. 31, 2017

(54) NANOPARTICLE FILTERING ENVIRONMENTAL CONTROL UNITS

(71) Applicant: Made in Space, Inc., Moffett Field, CA (US)

(72) Inventor: Michael Snyder, Mountain View, CA (US)

(73) Assignee: MADE IN SPACE, INC., Moffett Field, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 14/519,980

(22) Filed: Oct. 21, 2014

(65) Prior Publication Data

US 2015/0110911 A1    Apr. 23, 2015

Related U.S. Application Data

(63) Continuation-in-part of application No. 14/331,729, filed on Jul. 15, 2014.
(Continued)

(51) Int. Cl.
*B29C 64/20* (2017.01)
*B29C 64/106* (2017.01)
(Continued)

(52) U.S. Cl.
CPC .......... *B29C 64/106* (2017.08); *B29C 64/141* (2017.08); *B29C 64/20* (2017.08);
(Continued)

(58) Field of Classification Search
CPC ............ E21B 43/40; F23G 7/08; F23G 7/085; G01N 1/24; G01N 25/56; G01N 1/2273;
(Continued)

(56) References Cited

U.S. PATENT DOCUMENTS 4,439,979 A    4/1984    Winkelmann
5,255,556 A *  10/1993   Lobdell ................ G01N 1/2273
                                                         340/602
(Continued)

FOREIGN PATENT DOCUMENTS

EP    03253954.6        1/2004
EP    3023228 A1 *      5/2016    ............ B29C 67/00
JP    2009013395        1/2009

OTHER PUBLICATIONS

Brent Stephens, Ultrafine Particle Emissions from Desktop 3D Printers, Online Journal, Jun. 24, 2013, 6 Pages, Elsevier—SciVerse ScienceDirect, Online.
(Continued)

*Primary Examiner* — Duane Smith
*Assistant Examiner* — Minh-Chau Pham
(74) *Attorney, Agent, or Firm* — Terry M. Sanks, Esq.; Beusse Wolter Sanks & Maire, PLLC

(57) ABSTRACT

Environmental control units are disclosed. In an aspect, an environmental control unit for use with additive manufacturing and other VOC and particle emitting processes are disclosed. In an aspect, an environmental control unit comprising one or more filters, an air handler, a temperature control device, one or more sensors and a control unit is disclosed.

21 Claims, 23 Drawing Sheets

Related U.S. Application Data

(60) Provisional application No. 61/893,286, filed on Oct. 21, 2013.

(51) Int. Cl.
*B29C 64/141* (2017.01)
*B29C 64/386* (2017.01)
*B33Y 10/00* (2015.01)
*B33Y 30/00* (2015.01)
*B33Y 50/02* (2015.01)
*B33Y 40/00* (2015.01)

(52) U.S. Cl.
CPC ............ *B29C 64/386* (2017.08); *B33Y 10/00* (2014.12); *B33Y 30/00* (2014.12); *B33Y 40/00* (2014.12); *B33Y 50/02* (2014.12)

(58) Field of Classification Search
CPC .... G01N 1/2205; B01D 49/00; B08B 15/002; B08B 15/02; B23K 9/325; B23K 26/1405; B23K 37/08; H02H 11/004; G01W 1/04
USPC ......... 96/155, 157, 187, 142, 265, 417, 424; 166/75.11, 81.1; 175/66, 206; 210/806; 431/202; 73/31.02, 863.21; 55/356, 55/385.2, 418, 419, 469, DIG. 18, 55/DIG. 36, DIG. 34, 337
See application file for complete search history.

(56) References Cited

U.S. PATENT DOCUMENTS

| | | | |
|---|---|---|---|
| 5,303,141 A | 4/1994 | Batchelder et al. | |
| 5,541,802 A | 7/1996 | Bodahl-Johnsen | |
| 5,920,483 A | 7/1999 | Greenwood et al. | |
| 6,004,124 A | 12/1999 | Swanson et al. | |
| 6,007,318 A | 12/1999 | Russell | |
| 6,135,880 A | 10/2000 | Ho et al. | |
| 6,375,874 B1 | 4/2002 | Russell | |
| 6,575,548 B1 | 6/2003 | Corrigan et al. | |
| 6,758,876 B2 * | 7/2004 | Suzuki ............ H01L 21/67017 206/710 |
| 6,772,026 B2 | 8/2004 | Bradbury et al. | |
| 6,905,645 B2 | 6/2005 | Iskra | |
| 6,986,654 B2 | 1/2006 | Imiolek | |
| 6,989,115 B2 | 1/2006 | Russell | |
| 7,008,206 B2 | 3/2006 | Fong | |
| 7,008,209 B2 | 3/2006 | Iskra | |
| 7,027,887 B2 | 4/2006 | Gaylo | |
| 7,037,382 B2 | 5/2006 | Davidson | |
| 7,044,851 B2 * | 5/2006 | Peterson ............... F24F 3/16 454/187 |
| 7,073,442 B2 | 7/2006 | Fedor | |
| 7,168,935 B1 | 1/2007 | Taminger et al. | |
| 7,435,368 B2 | 10/2008 | Davidson | |
| 7,686,995 B2 | 3/2010 | Davidson | |
| 7,828,022 B2 | 11/2010 | Davidson | |
| 7,971,991 B2 | 7/2011 | Davidson | |
| 7,979,152 B2 | 7/2011 | Davidson | |
| 8,017,055 B2 | 9/2011 | Davidson | |
| 8,185,229 B2 | 5/2012 | Davidson | |
| 8,185,244 B2 * | 5/2012 | Wolfson ............... F24F 7/00 165/244 |
| 8,444,903 B2 | 5/2013 | Lyons | |
| 8,641,811 B2 * | 2/2014 | Mathena ............... F23G 7/085 166/75.11 |
| 8,794,263 B2 * | 8/2014 | Scott ............... B01D 46/0058 137/599.14 |
| 8,807,732 B2 | 8/2014 | Onozawa | |
| 9,272,237 B2 * | 3/2016 | Hammers ............ B01D 49/00 |
| 2001/0030383 A1 | 10/2001 | Swanson et al. | |
| 2002/0108358 A1 * | 8/2002 | Kelly, III ............ G03G 21/206 55/428 |
| 2003/0235635 A1 | 12/2003 | Fong et al. | |
| 2004/0004653 A1 | 1/2004 | Pryor | |
| 2004/0035542 A1 | 2/2004 | Ederer et al. | |
| 2004/0118932 A1 * | 6/2004 | Sanchez ............... F24F 5/0096 237/2 A |
| 2005/0133653 A1 | 6/2005 | Heaney et al. | |
| 2005/0194401 A1 | 9/2005 | Khoshnevis | |
| 2005/0271414 A1 * | 12/2005 | Katayama ............ G03G 21/206 399/93 |
| 2005/0280185 A1 | 12/2005 | Russell | |
| 2006/0156978 A1 | 7/2006 | Lipson et al. | |
| 2007/0028569 A1 * | 2/2007 | Murphy ............... B01D 45/16 55/337 |
| 2008/0047628 A1 | 2/2008 | Davidson | |
| 2008/0136066 A1 | 6/2008 | Taylor et al. | |
| 2008/0150192 A1 | 6/2008 | Perret et al. | |
| 2008/0241404 A1 | 10/2008 | Allaman | |
| 2009/0011066 A1 * | 1/2009 | Davidson ............... B29C 41/12 425/215 |
| 2009/0208577 A1 | 8/2009 | Xu et al. | |
| 2009/0267269 A1 | 10/2009 | Lim et al. | |
| 2011/0211016 A1 | 9/2011 | Davidson | |
| 2011/0219953 A1 * | 9/2011 | Schreiber ............ B01D 46/0005 95/273 |
| 2013/0209600 A1 | 8/2013 | Tow | |
| 2014/0085620 A1 | 3/2014 | Lobovsky et al. | |
| 2014/0189989 A1 | 7/2014 | Flitsch | |
| 2015/0037742 A1 * | 2/2015 | Malm .................. F23G 7/085 431/202 |
| 2015/0041416 A1 * | 2/2015 | Benavides ............. E21B 43/40 210/806 |
| 2015/0060557 A1 * | 3/2015 | Lau ..................... F24F 11/0012 236/44 C |
| 2015/0144284 A1 * | 5/2015 | Snyder ............... B29C 33/3842 164/76.1 |
| 2016/0001364 A1 * | 1/2016 | Mironets ............. B22F 3/1055 219/76.12 |
| 2016/0082652 A1 * | 3/2016 | Snyder ............... B29C 67/0088 264/40.1 |
| 2016/0214175 A1 * | 7/2016 | Nordstrom ........... B22F 3/1055 |

OTHER PUBLICATIONS

Dunn et al., "3D Printing in Space: Enabling New Markets and Accelerating the Growth of Orbital Infrastructure," Space Studies Institute, Oct. 29-31, 2010.

\* cited by examiner

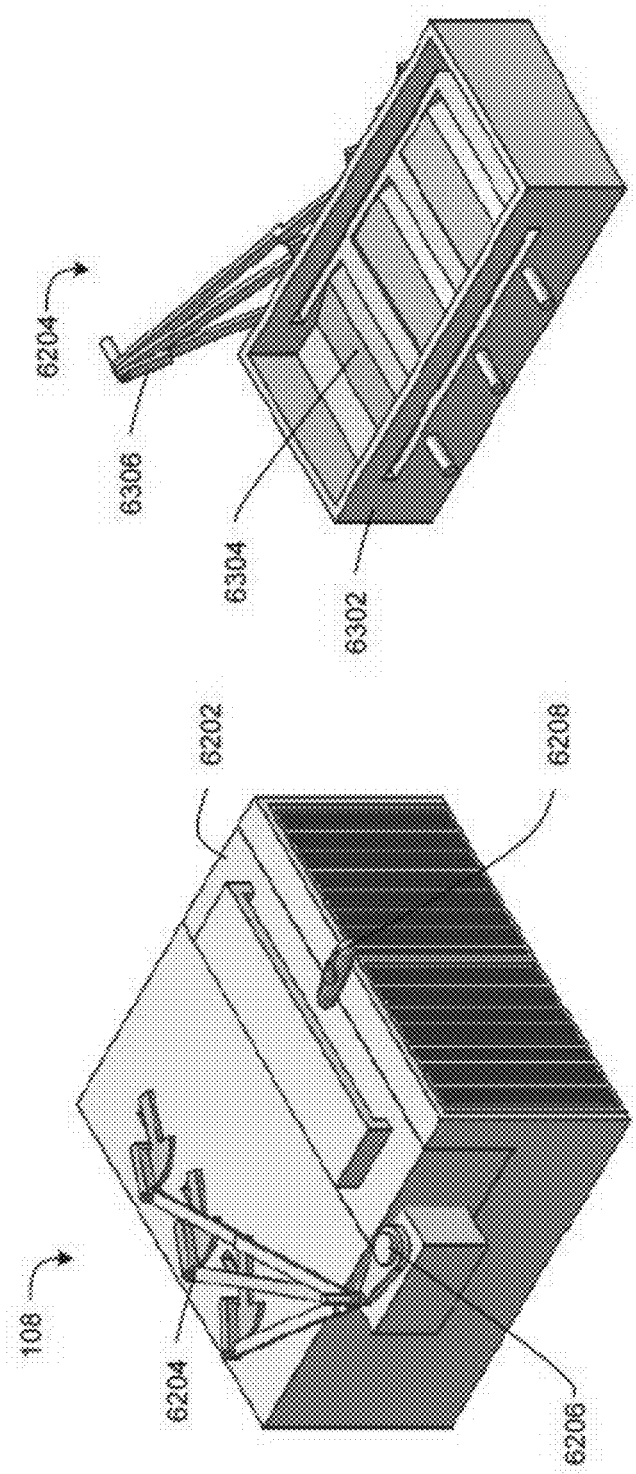

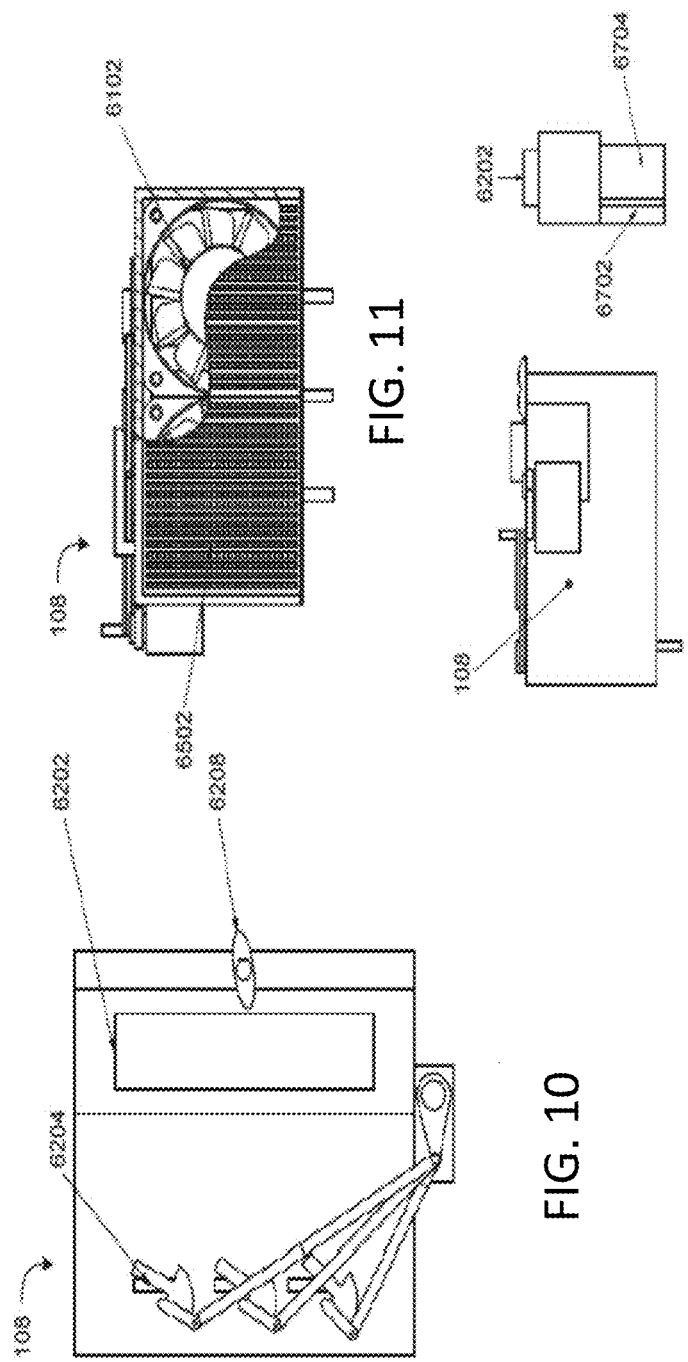

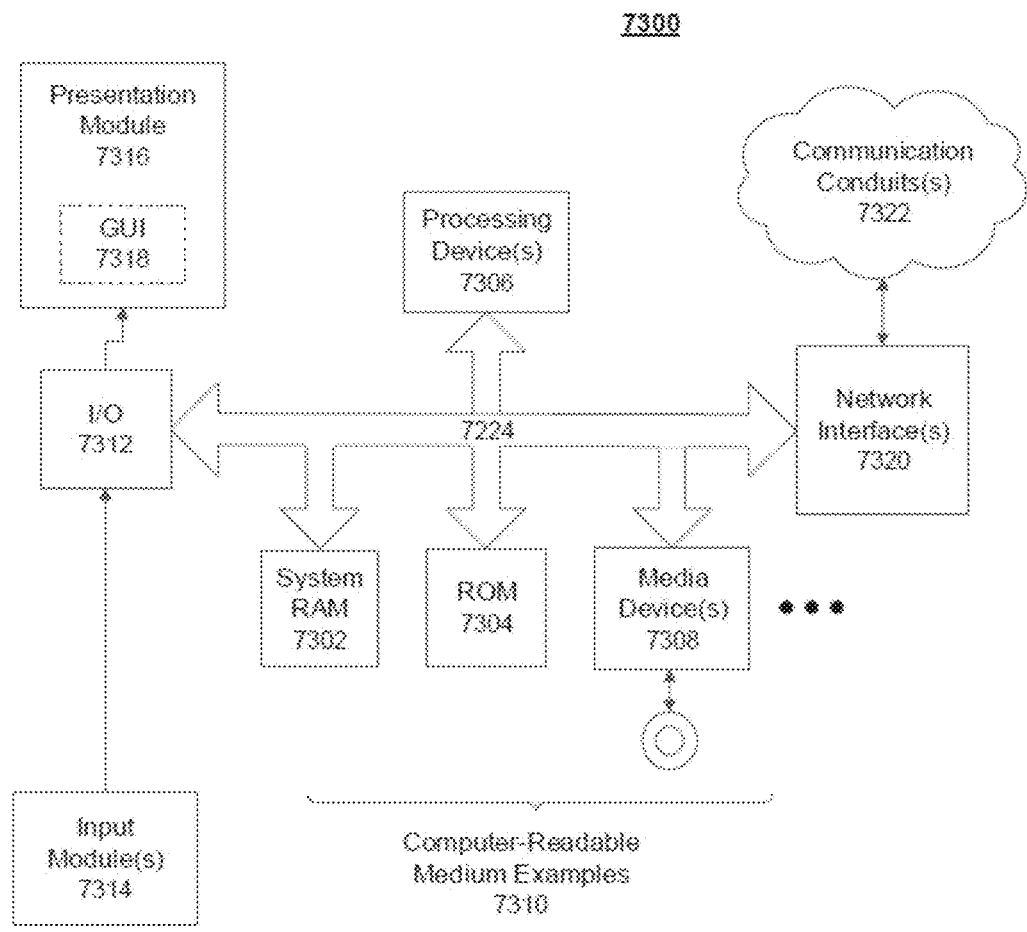
FIG. 29

NANOPARTICLE FILTERING ENVIRONMENTAL CONTROL UNITS

CROSS REFERENCE TO RELATED APPLICATIONS

This application claims the benefit of Applicant's U.S. Non-Provisional patent application Ser. No. 14/331,729, filed Jul. 15, 2014 and entitled "Manufacturing in Microgravity and Varying External Force Environments" and U.S. Provisional Patent Application No. 61/893,286, filed Oct. 21, 2013, and entitled "Additive Manufacturing Devices Configured For Various Environments," the entire contents of each of which are incorporated herein by reference.

FIELD OF THE DISCLOSURE

The present disclosure generally relates to environmental control units, and more particularly to environmental control units for additive manufacturing.

BACKGROUND

Additive manufacturing techniques enable the rapid creation of objects, structures, portions thereof, prototypes, replacement parts, experimental parts, and make-shift items. Additive manufacturing devices may produce parts via additive processes. That is, material is sequentially bonded or otherwise mechanically or chemically joined together in order to form the desired object. One class of additive manufacturing devices, fused deposition modeling (FDM) devices, utilize a source of thermoplastics to produce parts. An extrusion nozzle is positioned and heated to a temperature that will melt supplied thermoplastic. Thermoplastic is fed through the nozzle, thereby depositing a desired amount of molten plastic at a location in order to form a portion of a part. Other additive processes use powders or granular material to produce parts. One class of additive manufacturing devices, selective laser melting (SLM) generally fuses fine metal powders together with a high power laser. One class of additive manufacturing devices, stereolithography (SLA) generally cures a photo-reactive resin with a UV laser or other radiation source.

Additive manufacturing processes produce various emissions, including aerosols, VOCs and particles. These emissions can be harmful to humans and animals and can contribute to environmental pollution. Specifically, some particulate emissions from additive manufacturing processes are in the size range that is respirable by humans and animals. Other emissions from additive manufacturing processes are chemicals that are harmful to humans and animals.

Given the foregoing, devices, systems and methods for reducing emissions from additive manufacturing techniques are needed.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

Aspects of the present disclosure meet the above-identified needs by providing apparatus, systems, and methods which enable capture, including removal or reduction, of an emission from an additive manufacturing process. In an aspect, an environmental control unit (ECU) that reduces an emission from an additive manufacturing process is disclosed. In an aspect, the ECU comprises an air handler; at least one filter in circulation communication with the air handler; a temperature control device; at least one sensor; and a control unit in electrical communication with the air handler, the temperature control device and the at least one sensor.

As used herein, "emission" means any substance formed by or present in an additive manufacturing process. In an aspect, an "emission" is an undesirable substance. In an aspect, an emission is a particle, such as a particle of the feedstock used in an additive manufacturing process or a by-product of the additive manufacturing process, such as a thermal decomposition product. In an aspect, an emission is a particle, such as a nanoparticle, a microparticle, or a larger or a smaller particle. In an aspect, an emission is a nanoparticle with diameter from 1-5000 nm, including all values and subranges therein. In an aspect, an emission is a nanoparticle with diameter from 1-1000 nm, including all values and subranges therein. In an aspect, an emission is a nanoparticle with diameter from 1-100 nm. In an aspect, an emission is a nanoparticle with diameter from 10-50 microns. In an aspect, an emission is a particle with diameter less than 5000 nm. In an aspect, an emission is a particle with diameter greater than 100 nm. In an aspect, an emission is a particle with diameter less than 100 nm. In an aspect, an emission is a gas, such as an aerosol, a VOC, or a decomposition byproduct of the additive manufacturing process. It is noted the word "emission" includes feedstock or other material used in the additive manufacturing process, such as the resin, granular metal, thermoplastic, granular thermoplastic, polymer, ceramic, metal alloy or other material used. In an aspect, the ECU reduces the amount of an emission in a volume, such as a build volume of an additive manufacturing device or a room or other environment. In an aspect, the ECU reduces the amount of one or more emissions. In an aspect, the ECU reduces the amount of more than one emission having different physical type, such as reducing the number of particles in a volume and also reducing the concentration of a gaseous emission in a volume. In an aspect, the ECU captures an emission. Unless otherwise specified, the words "emissions" and "emission" are used interchangeably.

In an aspect, the ECU can be used with any type of additive manufacturing process. In an aspect, the ECU can be used with in a FDM additive manufacturing process. In an aspect, the ECU can be used with in a SLA additive manufacturing process. In an aspect, the ECU can be used with in a SLM additive manufacturing process.

Among other features and advantages, devices and systems in accordance with the present disclosure enable capture of emissions without the need to ventilate the room where the additive manufacturing device is located.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements. The ECU may include features and elements that are not shown in the drawings but are described elsewhere herein.

FIG. 8 is a perspective view of an environmental control unit configured to facilitate operation of an additive manufacturing device in an enclosed or controlled environment, the environmental control unit having a shutter assembly, according to various aspects of the present disclosure.

FIG. 9 is a perspective view of shutter assembly of the environmental control unit of FIG. 8.

FIG. 10 is a top view of the environmental control unit of FIG. 8.

FIG. 11 is a front view of the environmental control unit of FIG. 8, having a partial cutaway view exposing two fans.

FIG. 12 is a side view of the environmental control unit of FIG. 8.

FIG. 13 is a side view of a removable filter for the environmental control unit of FIG. 8.

FIG. 29 is a block diagram of an exemplary computing system useful for implementing various aspects of the present disclosure.

DETAILED DESCRIPTION

Figure 1:
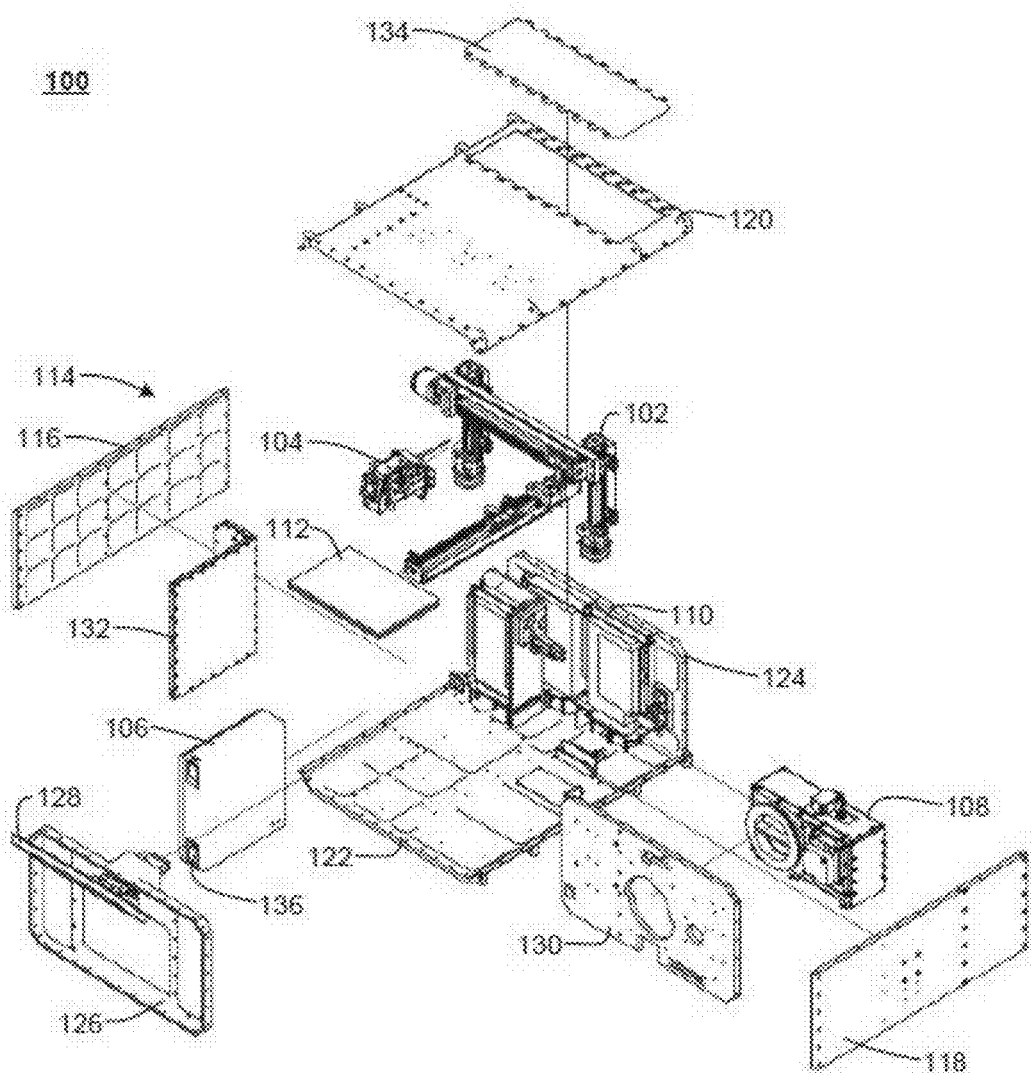
FIG. 1 is an exploded perspective view including an environmental control unit according to aspects of the present disclosure incorporated into an additive manufacturing device.

The present disclosure is directed to apparatus, systems, and methods which enable reduction of an emission from devices and systems, such as additive manufacturing systems.

Apparatus and methods disclosed herein may be adapted for use in a variety of environments, such as industrial environments, small business environments, home environments, or spacecraft environments. Apparatus and methods disclosed herein may be adapted for use with a variety of devices, including additive manufacturing devices, including desk-top devices and larger devices. These adaptions may include changing the size of components, configuration of components, or type of components to achieve the desired result; increasing the number of ECU units used in a system to reduce emissions to the desired level, as defined by the user, and other adaption that a person skilled in the relevant art(s) would understand and be able to implement after reading the present disclosure.

Additive manufacturing devices use different substances to create objects. These different substances and additive manufacturing device processes for emissions, including undesirable substances. For example, molten polymers typically outgas hydrocarbons and other organic volatile compounds including acids and toxins. Example toxic components include hydrogen cyanide outgassing from acrylonitrile butadiene styrene (ABS) and hydrogen fluoride emissions from molten fluoropolymer. Further, processes related to welding and sintering can emit dangerous fumes, often from contaminants and chemicals used in the processing of the powders, resins, filaments, or wire. Finally, even without consideration for safety, controlling the build environment for an additive manufacturing process may be advantageous, as environmental factors such as humidity, contamination, and temperature-nonuniformity can cause unpredicted issues with the final printed part.

In an aspect, provided is an additive manufacturing device comprising an environmental control unit, the environmental control unit comprising: at least one filter configured to capture nanoparticles generated by operation of the additive manufacturing device; an air handler configured to drive atmosphere contained within an airtight volume of the additive manufacturing device through the at least one filter; a temperature control device; at least one sensor; and a control unit in electrical communication with the air handler, the temperature control device and the at least one sensor. In an aspect, the additive manufacturing device is extrusion-based or powder-based. In aspects, the air handler is one or more of: a centrifugal pump; a compressor; a piston; a pump; a fan; a vent motor and vent; a shutter; and a blower; and the filter is one or more of: carbon; HEPA; doped HEPA; doped carbon; activated charcoal; UPLA; electrostatic precipitator; and an air ionizer.

In an aspect, provided is an additive manufacturing device environmental control unit adapted to capture an emission generated from additive manufacturing, the environmental control unit comprising: an air handler; at least one filter in circulation communication with the air handler; a temperature control device; at least one sensor; and a control unit in electrical communication with the air handler, the temperature control device and the at least one sensor.

In aspects, the environmental control unit is positioned either within an airtight additive manufacturing device build volume or in circulation communication with an airtight additive manufacturing device build volume. In an aspect, a filter is replaceable by hand from within or outside the additive manufacturing device.

In an aspect, an emission is one or more of: a thermopolymer particle; a nanoparticle; a metal particle; a composite particle; a hydrocarbon; a volatile organic compound (VOC); and a gas. In an aspect, the emission is thermopolymer nanoparticles from an extrusion-based additive manufacturing device.

In an aspect, provided is a method of capturing an emission generated by operation of an extrusion-based additive manufacturing device, the method comprising: (a) providing an environmental control unit comprising: an air handler; a filter in circulation communication with the air handler; a temperature control device; one or more sensors; and a control unit in electrical communication with the air handler, the temperature control device and the one or more sensors; either (b)(i) drawing air from the additive manufacturing device construction volume into the air handler, which air handler is adapted to direct the air into the filter; or (b)(ii) drawing air from outside the additive manufacturing device construction volume into the air handler, which air handler is adapted to direct the air into the filter; (c) sensing with a sensor one or more of: the temperature inside the additive manufacturing device construction volume; the humidity inside the additive manufacturing device construction volume; the number of particles inside the additive manufacturing device construction volume; the composition of particles inside the additive manufacturing device construction volume; the composition of the air environment inside the additive manufacturing device construction volume; and the amount of air circulating inside the additive manufacturing device construction volume; (d) controlling with the control unit one or more of: the temperature inside the additive manufacturing device construction volume; the amount of air flowing through the air handler; and the time the air is drawn into the air handler; and either (e)(i) returning the air to the additive manufacturing device construction volume; or (e)(ii) expelling the air from the additive manufacturing device construction volume.

The selection of components of the environmental control unit may be selected according to a variety of factors, including the desired use, economic reasons, the desired level of removal or reduction of an emission, and other factors, as will be appreciated to a person of skill in the relevant art(s) upon reading the disclosure herein. Options for components are provided here for illustration purposes, however, a person of skill in the relevant art(s) will understand other options may be substituted for the described components, and the selection and use thereof is intended to be included in the disclosure herein to the extent as if the components were specifically illustrated. In addition, the connection of components together and order of components may be performed according to a variety of factors, including performance, efficiency and other factors known to a person of ordinary skill in the relevant art(s) after reading the disclosure herein.

The ECU includes a temperature control device. The temperature control device can be a heater or cooler or a device which acts as both a heater or cooler. Temperature control device types and their use are known to a person of ordinary skill in the relevant art(s) upon reading the disclosure herein. Temperature control devices can be configured, calibrated, incorporated into the ECU, used, and replaced as known to a person of ordinary skill in the relevant art(s). A temperature control device is useful in an additive manufacturing process for reasons such as improving the quality of a print and other reasons, as known to a person of ordinary skill in the relevant art(s) upon reading the disclosure herein. In an aspect, the temperature control device is controlled by the control unit.

The ECU includes at least one sensor. Sensors can be integrated into the ECU to monitor temperature, humidity, air pressure, air velocity, chemical concentration, particle concentration, or other environmental conditions. In an aspect, sensors can be connected to hardware (HW) or software (SW) indicators, which predict or determine the appropriate date of filter-expiration based on the parameters measured. The sensors can also be used to predict ECU performance and efficiency given the current operating conditions. Additionally, sensors can be attached to warning devices or applications so that monitoring concerns, such as detection of particulates, gases, or conditions that could lead to the ECU not operating in a manner safe for nearby users can alert or warn operating personnel that the device may not be adequately preventing hazardous health conditions. The software determining factors could be performed by a local computer or network assisted device, a microprocessor on the ECU, or in a chip attached to each sensor. Finally, these sensors can be used to inform personnel on the quality of the resulting print.

Sensor types and their use and selection are known to a person of ordinary skill in the relevant art(s) upon reading the disclosure herein. Sensors can be configured, calibrated, incorporated into the ECU, used, and replaced as known to a person of ordinary skill in the relevant art(s). One or more sensors is connected electrically or by other means of communication to control electronics, including the control unit, as described herein.

In aspects, a sensor is one or more of: a particle counter; a thermometer; a humidity sensor; an air pressure sensor; a chemical sensor; and an air velocity sensor. In aspects, a conventional particle counter is a sensor in the ECU. As is known, particle counters can be used to measure a number of different particle parameters. In some particle counters, the overall number of particles in a given sample is measured, for example. In some particle counters, the number of particles in a particular particle size range is measured, for example. In an aspect, a thermometer is a sensor in the ECU. The use of a variety of types of thermometers in the ECU is known to a person of ordinary skill in the relevant art(s) upon reading the disclosure herein. In an aspect, a humidity sensor is a sensor in the ECU. The use of a variety of types of humidity sensors in the ECU is known to a person of ordinary skill in the relevant art(s) upon reading the disclosure herein. In an aspect, an air pressure sensor is a sensor in the ECU. The use of a variety of types of air pressure sensors in the ECU is known to a person of ordinary skill in the relevant art(s) upon reading the disclosure herein. In an aspect, an air velocity sensor is a sensor in the ECU. The use of a variety of types of air velocity sensors in the ECU is known to a person of ordinary skill in the relevant art(s) upon reading the disclosure herein. In an aspect, a chemical sensor is a sensor in the ECU. The use of a variety of types of chemical sensors in the ECU is known to a person of ordinary skill in the relevant art(s) upon reading the disclosure herein. For example, sensors which measure different types of gases or chemical compounds are known. Such sensors can be instrumentation-based, such as a spectrometer or gas chromatograph, or can be physical-based, such as a color-indicator on a chemically-treated paper which indicates the presence or concentration of a measured substance. In an aspect, the ECU includes more than one type of chemical sensor or a chemical sensor that can sense more than one chemical substance. In an aspect, the ECU includes modular chemical sensors, which can be added to and removed from the ECU depending on the desired substances to be sensed or monitored.

In aspects, the ECU comprises one sensor. In aspects, the ECU comprises more than one sensor. In aspects, the ECU comprises more than one type of sensor, such as a thermometer and a particle counter. In aspects, the ECU comprises a thermometer and a particle counter. In aspects, the ECU comprises a thermometer, a chemical sensor and a particle counter. Any combination of the same or different sensors is included in the description herein as aspects of the ECU described.

The ECU includes an air handler. In an aspect, the ECU includes one or more air handlers. In an aspect, the air handler is configured to drive atmosphere contained within an airtight volume of an additive manufacturing device through another component of the ECU, for example a filter. In an aspect, the air handler is one or more of: a centrifugal pump; a compressor; a piston; a pump; a fan; a vent motor and vent; a shutter; a temperature differential mover; and a blower. Air handlers can be configured, calibrated, incorporated into the ECU, used, and replaced as known to a person of ordinary skill in the relevant art(s). Air handler types and their use are known to a person of ordinary skill in the relevant art(s) upon reading the disclosure herein. The velocity of the air passing through the air handler can be adjusted as known to a person of ordinary skill in the relevant art(s). Air handlers may be operated as a blower or in vacuum, as is known to a person of ordinary skill in the relevant art(s). In aspects, the ECU can be used to blow air into an enclosure. This air can be air from the operating environment or air or other gases supplied from outside the environment, such as nitrogen, oxygen, argon or other gases. In aspects, the ECU can be used to pull air out of an enclosure.

The ECU includes at least one filter. In an aspect, the filter is configured to capture nanoparticles generated by operation of an additive manufacturing device. In aspects, the filter is one or more of: carbon; HEPA; doped HEPA; doped carbon; activated charcoal; UPLA; electrostatic precipitator; and an air ionizer. In an aspect, a filter is a HEPA filter.

Although filter is used in the singular in portions of the description herein, it is intended that a filter stack comprising one or more of the same or different filters may also be used. In an aspect, a HEPA filter and an activated charcoal filter are used in the ECU.

In an aspect, a filter or filters used in the ECU are chosen to reduce an emission of a given application as well as be chemically resistant to an emission of a given application. In an aspect, the ECU includes different filters that are designed to reduce emissions of specific materials. In different aspects, the different filters are used individually or in combination. In an aspect, a different filter or filters is inserted into the ECU prior to use of the ECU for reducing emissions of a specific material. In an aspect, the ECU includes more than one filter, each filter designed for use with a particular application. In an aspect, more than one of the same type filter may be used sequentially in the ECU disclosed. In an aspect, more than one of a different type filter may be used sequentially in the ECU disclosed such as in a filter stack. As is known by a person skilled in the relevant art(s), the use of multiple filters may reduce the airflow through the ECU. Changes in flow from the air handler may be used to counteract this effect, in an aspect. In an aspect, a filter is used to capture emissions of a particular particle size range or ranges. In an aspect, a filter is used to capture emissions of a particular chemical or chemicals. The particular filters and the use thereof are understood by a person skilled in the relevant art(s) after reading the present disclosure.

In an aspect, a physical filter is used in the ECU. Various types of physical filters and their use to filter various types of emissions are known to one of ordinary skill in the relevant art(s). In an aspect, a high efficiency particulate air (HEPA) filter is used. In an aspect, a HEPA filter is used to reduce emissions of particles from FDM or SLM additive manufacturing processes. In an aspect, an ultra-low penetration air (ULPA) filter is used, for example in a cleanroom environment. If power is more of an issue than filtration, a lower MERV rated filter can be used, leading to less pressure being required to pull the polluted air through the ECU. In an aspect, such as where certain types of metals are being manufactured, such as aluminum, a nanofiber filter may be used. In an aspect, polymeric membranes may be used, for example, if rust/oxidation is an issue on metal feedstock.

In an aspect, in order to trap some emissions from certain processes and materials, such as low molecular weight gases (e.g. formaldehyde and ammonia), filters (either carbon or HEPA) are often coated with chemicals which cause the gas to be absorbed into a chemical reaction (otherwise known as chemisorption). In an aspect, the ECU may use a carbon or HEPA filter which has been "doped" as is understood by a person skilled in the relevant art(s). The use of a "doped" filter may be useful to reduce the emission of harder to filter compounds. In an aspect, a different shape of filter, such as pellets of various compositions, may be introduced into the flow pattern of the ECU in order to capture certain chemical compounds and gases. Again, the particular filters and the use thereof are understood by a person skilled in the relevant art(s) after reading the present disclosure.

In an aspect, the ECU disclosed includes a prefilter. A prefilter is useful for certain applications, including for 3D printers which require low maintenance, industrial scale machines, or for processes that are particularly polluting. In aspects, a prefilter is a cyclonic separator, a grate or other known component. In general, an easily replaced prefilter is useful for decreasing maintenance time, and can be easily be configured and inserted into the ECU as described herein.

In an aspect, the ECU disclosed herein comprises one or more of: (a) a prefilter designed to capture particles with larger size; (b) a particle filter, for example, a HEPA filter; and (c) a gas/vapor filter, for example an activated carbon filter bed or filter which may include particles impregnated with materials such as inorganic materials, particles impregnated with silver, particles impregnated with flocculating agent, polymer coated carbon and other modifications, as will be apparent to one of ordinary skill upon a review of the disclosure herein.

In an aspect, the ECU disclosed herein has an optional attachment so that contaminated air can be piped outside the build volume. This allows the use of the ECU to be used with processes that have emittants that are very difficult to filter and do not have safe chemical reactions that could neutralize them.

In an aspect, the ECU can be used with a filter that uses non-physical filter means such as an electrostatic precipitator or air ionizer to filter air without needing to have replaceable filters such as fiber or carbon-based filters. Non-physical filter means can be used in combination with a physical filter or to the exclusion of a physical filter. As known by a person skilled in the relevant art(s), a non-physical filter may require cleaning of parts, such as charged metal parts. In an aspect, the ECU comprises both a physical filter and a non-physical filter.

In an aspect, the ECU is used with a bio-based printing system. In an aspect, a filter in a bio-based printing system is an electrostatic precipitator. For bio-based printing, electrostatic precipitators have the added advantage of being relatively sterile, as bacteria can often form in very large numbers within HEPA filters. Electrostatic precipitators are also minimally intrusive to the flow, in contrast to the large pressure drops required to pull air through more traditional fiber and porous filters. As is known in the art, there is a large dependence on the effectiveness of an electrostatic precipitator with the particle resistivity. An electrostatic precipitator also requires electrical power to have any filtration, in contrast to more passive systems. However, electrostatic precipitators are often applicable over a wide range of sizes and materials, and can be used for both prefilters and the main filter if a HEPA or carbon-based filter is not useful or preferred for a given application. Further, the maintenance of these filters can be automated through techniques such as vibration or washing in a fluid.

In an aspect, flow manipulation techniques can be used in the ECU before and during the filter stages. Such flow manipulation techniques include cyclonic separation. Flow manipulation techniques can be used to filter out larger particles from the air. Through the elimination of these larger, heavier particles, the lifetime of the filters is greatly increased.

Flow manipulation methods may also be useful for decreasing humidity and modulating temperature, which is very important to ensuring quality prints for certain additive manufacturing devices. Techniques such as condensation techniques can be used to coat the incoming particles with a fluid. These techniques allow use of flow manipulation techniques to more effectively capture smaller sized particles before their impingement onto a physical filter. The use of these techniques in the described ECU is known to one of ordinary skill in the relevant art(s) after reading the description herein.

For some processes and applications it is important to keep the build environment as sterilized as possible. In an aspect, a UV light purifier can be used in conjunction with other filtration systems to kill pathogens and microorganisms in the build environment. This aspect has applications in any additive manufacturing device that uses organic matter that deposits living cells or tissues onto a scaffold, surface, wound, or other target, such as for bioprinters and printers using soil-based processing. This aspect is also useful in an additive manufacturing device used to create biocompatible parts or medical tools that must be immediately useable.

The modularity of the ECU also allows for its use in applications that result in highly corrosive outgassing. These applications typically require filters to be chemically treated to extend the filter lifetime against the environment, and typically require specialized build materials for the ECU. Alloys and polymers can be chosen for the modular design which will protect the ECU from the environment so that system failure is prevented. Development of stress corrosion cracking (which would result in contamination breaches) can also be prevented by changing the ECU filter material. Coatings, such paints containing titanium dioxide, can be used to protect the surface from particularly corrosive gases, such as highly acidic gases. The use of these materials is known to one of ordinary skill in the relevant art(s) after reading the disclosure herein. The material of the ECU housing can be selected to a desired operating environment. For example, in environments that are expected to be continuously subjected to corrosive fumes such as fluoropolymer processing or printing, a metal with particularly excellent corrosion resistance may be the appropriate choice (e.g. Hastelloy or Inconel). Other material choices and their use are apparent to one of ordinary skill in the relevant art(s) after reading the disclosure herein.

In an aspect, particles and gases can also be filtered out of the air during the cleaning or removal stage of a powder based additive manufacturing system. This is important for the health and safety of users of many laser sintering printers that use metals or ceramics. Also, the ECU can be used with systems that use powder based coatings or spray coatings that produce toxic environments. In an aspect, the ECU can be used in stereolithography-based printers where some resins can outgas irritating or dangerous gases. In an aspect, the ECU can optionally include an ozone generator.

In an aspect, the ECU described herein can be used during printing operations, pre-processing and during part removal.

Many metal and polymer powders pose a flash fire risk. In an aspect, the ECU can be used to assist with proper metal and polymer powder handling and storage in an enclosure to reduce the fire risk in the environment while adding a safety wall to protect users. In an aspect, the ECU can include an electrostatic precipitator or a physical filter or a solid state device. In an aspect, use of the ECU can mitigate the risk of airborne particulate matter release upon opening and closing the enclosure.

Brazing, welding, laser cutting, and soldering of metals produce fumes that pose a health risk to operators. Processing performed in an enclosure either by a computer or operated manually outside of the enclosure is used to protect the operator. In an aspect, the ECU disclosed herein can be used during this operation, to reduce the accumulation of smoke and fumes which could obscure the visibility of the weld spot and part. Thus, in an aspect, the ECU disclosed herein can serve dual-duty as both a safety device and operation quality-assurance.

Operations taking place outside of an enclosure such as powder coating, spray-based coating, brazing, welding, soldering, extrusion, injection molding, and 3D printing could also benefit from the use of a nearby ECU. The ECU filters and cleans the local environment, directly filtering the contaminated air at the point where it is generated. Application of modular ducts or tubes can also be used to focus the intake of air near a source of contamination or fumes. An example of this would be a free-standing or mobile ECU with duct focused near the surface of a device being powder coated in order to increase the safety of the operator and any nearby persons.

In an aspect, controlling humidity is useful in an additive manufacturing process and other process to ensure consistency of material properties, for example. In an aspect, the ECU disclosed herein includes a dehumidifier or humidifier. In an aspect, the ECU includes a humidity sensor and control electronics connected to the dehumidifier or humidifier to change the humidity level in the additive manufacturing process processing volume. In an aspect, the dehumidifier makes use of thermal or electric condensation (utilizing the large temperature gradients often associated with FDM printing), exchangeable desiccant filters, or an ionic membrane dehumidifier, or example. This aspect allows for the introduction of additive manufacture processes in less-hospitable environments, such as on a ship or in very humid areas. Dehumidification of the air passing through the ECU can also be useful to protect the ECU filters and prevent bacteria growth, for example.

In an aspect, the ECU disclosed here comprises a polarized-media electronic media cleaner. In general, a polarized-media electronic media converts 24 volt current to safe DC voltage to establish the polarized electric field. Airborne particles become polarized as they pass through the electric field and adhere to a disposable fiber media pad. Ultra-fine particles (UFPs) that are not collected on their initial pass through the media pad are polarized and agglomerate to other particles, odor and VOC molecules and are collected on subsequent passes. In an embodiment, the ECU disclosed herein comprises an ionic purifier. In general, an ionic purifier uses charged electrical surfaces or needles to generate electrically charged air or gas ions. These ions attach to airborne particles which are then electrostatically attracted to a charged collector plate.

The ECU includes a control unit in electrical communication with the air handler, the temperature control device and a sensor. The control unit can be connected to a computer or other device that includes parameters and means to control the components. For example, the control unit may provide a signal to increase or decrease the volume of air flowing through the air handler in response to the temperature sensor input. The control unit may provide input to the temperature control device in response to the temperature sensor indicating the temperature is not within a predetermined temperature range for a process, in an aspect. Other uses of the control unit are known to a person of ordinary skill in the relevant art(s) upon reading the disclosure herein.

Experimental

A preliminary experiment was conducted using a nanoparticle counter which can detect the concentration of particles sized from 20 nm to 1 micron. The nanoparticle counter used included a probe which can be inserted into a desired area. A conference room had an estimated 17,000 particles per cc in ambient, steady state conditions. The background for the room where a FDM device was located was 18600 particles per cc. The probe was inserted into the device build volume and a background reading taken (nearly 18600 to 19000 particles per cc). The extruder was then set to 230 degrees Celsius, the ECU as described in FIG. 3 with a nanoparticle-capturing filter was turned on, and a print begun. The concentration seemed to find steady state after 1 minute, showing an increase to around 280,000 particles per cc inside the build volume. When the ECU was turned off, a spike to almost 400,000 particles per cc occurred. With the ECU turned back on and the print finished, after only around 1:30 minutes, the particle concentration returned to a steady state background of around 12,000 particles per cc. This experiment shows the ECU used decreases nanoparticle count.

Figure 2:
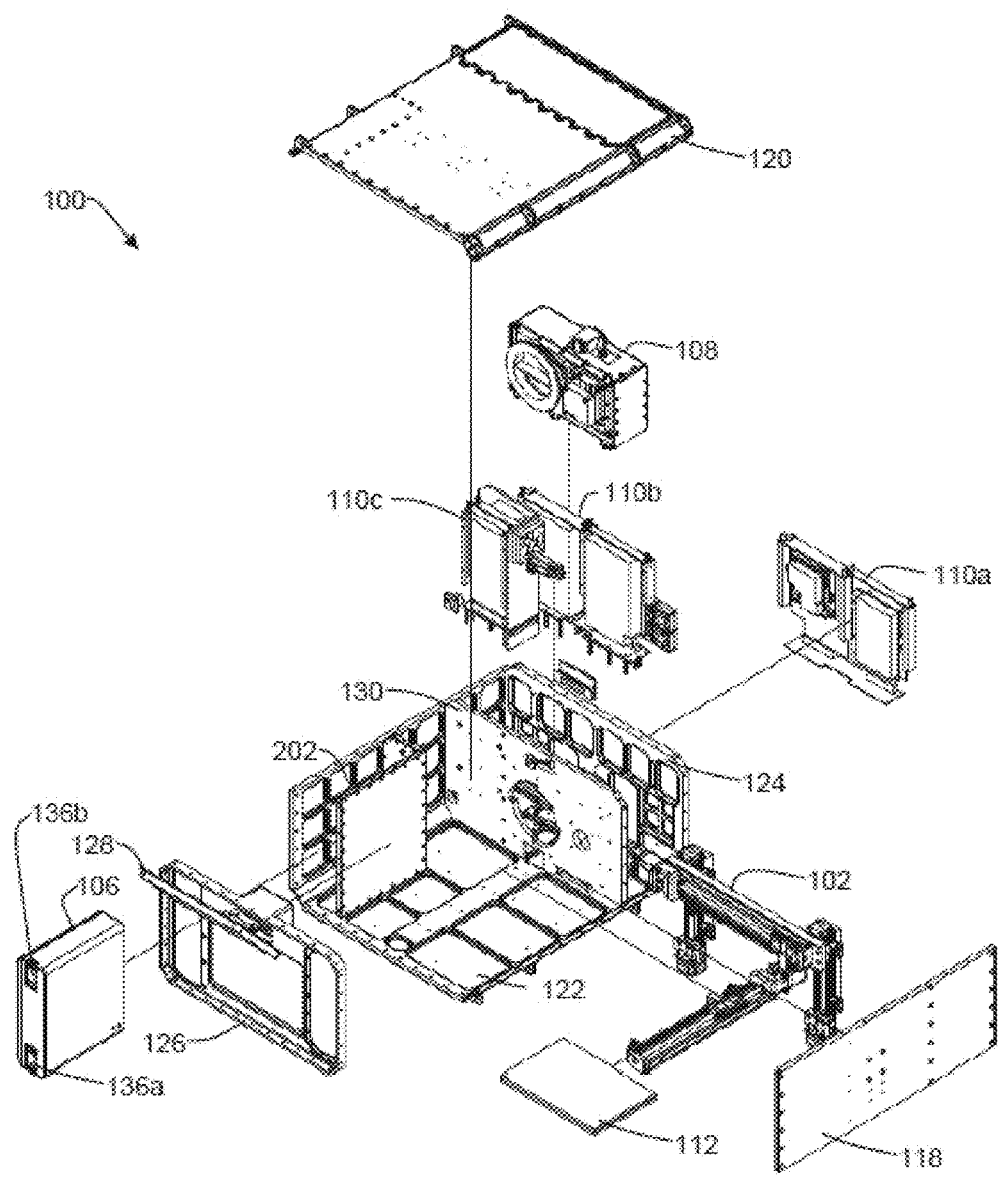
FIG. 2 is an exploded perspective view including the environmental control unit incorporated into an additive manufacturing device shown in FIG. 1.

Referring now to the figures, FIGS. 1-2 show various views and configuration of an ECU shown with an additive manufacturing device, according to aspects of the present disclosure. Although a particular type of additive manufacturing device is shown in FIGS. 1-2, it is apparent to a person of ordinary skill in the relevant art(s) that the ECU shown and described herein can be used with other types of additive manufacturing devices and other systems, upon reading the disclosure herein.

Additive manufacturing device 100 comprises a traverse system 102, an extruder 104, a feedstock source 106, control electronics and power supply 110 (labeled as control electronics 110a-c in FIG. 2), a build platform assembly 112 and frame 114. Traverse system 102 may be mounted to plate 130, providing a common anchor point. Feedstock 106 comprises connection mechanisms 136 (labeled as connection mechanisms 136a-b) which engage a portion of device 100 and allow easy, tool-free removal of empty cartridges 106. Device 100 may include multiple feedstock sources of different types, colors, and the like and may include multiple cartridge receptacles 202. The exterior of enclosure 114 may be formed by a baseplate 122, a back plate 124, a first side plate 116, a second side plate 118, a top plate 120 having an access panel 134 and a front plate 126 having a door 128. The interior of enclosure 114 may include a partition 130 which separates the build volume, traverse assembly 102, build platform assembly 112 and extruder 104 from a rear section containing control electronics 110 and ECU 108. Partition 130 contains an opening which the filter access of ECU interlocks with, allowing access to ECU 108 filters from within the build volume. In this manner, a user may easily service ECU 108 without removing device 100 from its mounting location. The interior of enclosure 114 may also include wall 132. Door 128 allows the user to access the build area in order to remove completed parts, perform maintenance and the like. Door 128 may have a window.

Environmental control unit 108 is configured to regulate the environment of an additive manufacturing device or other system or device. In an aspect, environmental control unit 108 comprises at least one air handler, a temperature control device (e.g., a heater and/or an air conditioning unit), at least one filter, least one sensor; and a control unit. Environmental control unit 108 regulates one or more of: temperature, humidity, air circulation, air pressure, chemical composition, particulate number, particulate size, air velocity and air quality within a device or environment, thereby preventing outgassing and contamination of the environment in which the device is located during operation. Environmental control unit 108 includes one or more sensors which measure concentrations of harmful gases or other materials or environmental factors which would be dangerous to release from within an enclosure. In this manner, ECU 108 may monitor and protect individuals and equipment in tight quarters with a device (e.g., on a space station, on a marine vessel, in a laboratory or in an office environment) from potentially harmful outgassing if an enclosure is opened before ECU 108 eliminates or captures such gases or materials. The components of ECU 108 are connected with a control unit. The control unit operates ECU 108, facilitating regulation of temperature, humidity, air quality, air circulation and the like. These aspects are further described herein.

In some aspects an enclosure includes a door controllable by the control unit. In some aspects, the door may not be opened until the ECU determines that, utilizing sensors and/or operating parameters (e.g., run time, wait time, emission concentration level thresholds, and the like) the enclosed environment will not contaminate the outside environment.

The control unit may include redundant systems. That is, if the primary system fails, secondary and other backup systems take over. ECU may comprise a data connection such as a wireless communications module, an Ethernet connection, a USB connection, or the like which is communicatively connected to other portions of ECU in order to facilitate communication with off-site or on-site computing devices. In some aspects, off-site or on-site computing devices provide some instructions and control (e.g., parameter limits), thereby augmenting the operations carried out by the control unit.

Figure 3:
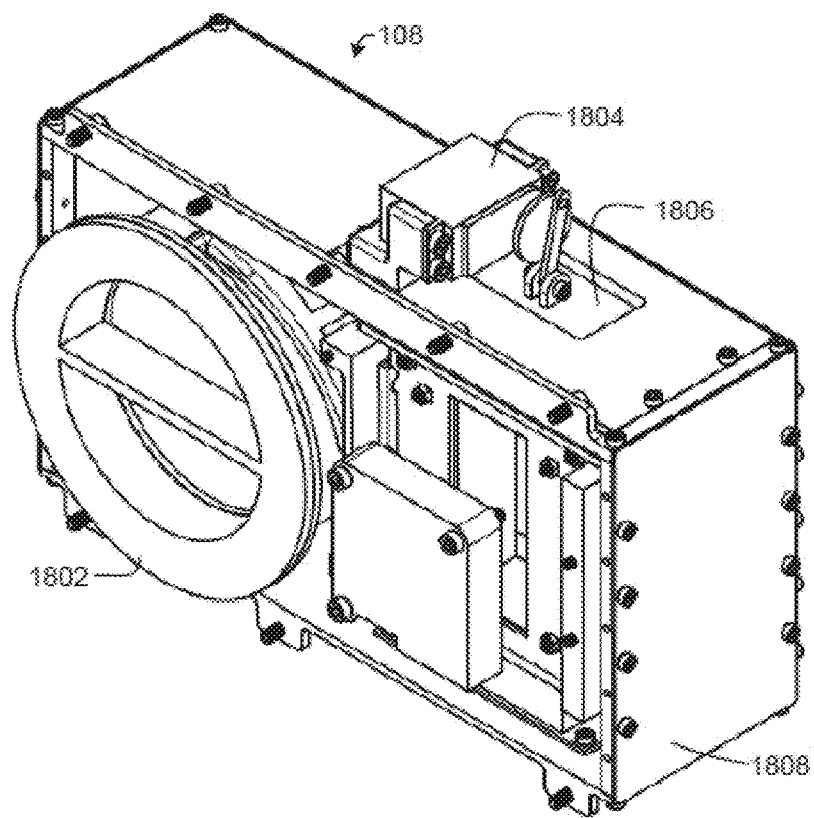
FIG. 3 is a perspective view of an environmental control unit according to various aspects of the present disclosure.
Figure 4:
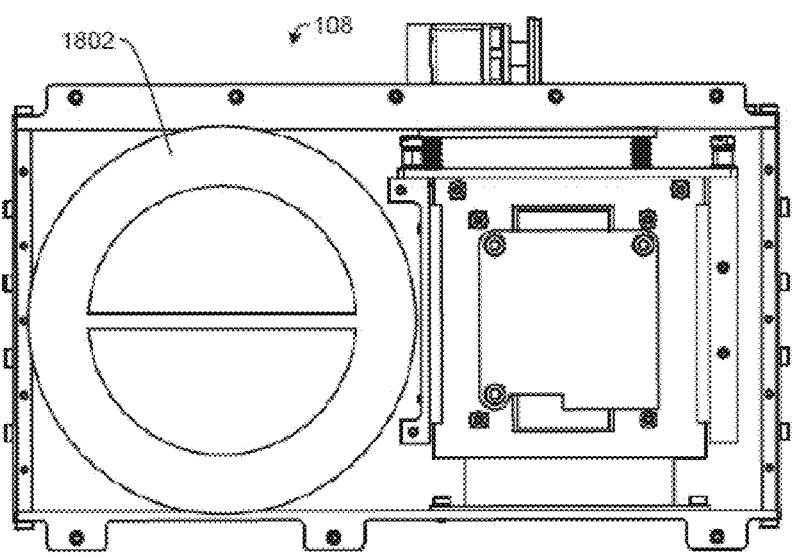
FIG. 4 is a front view of the environmental control unit of FIG. 3.
Figure 5:
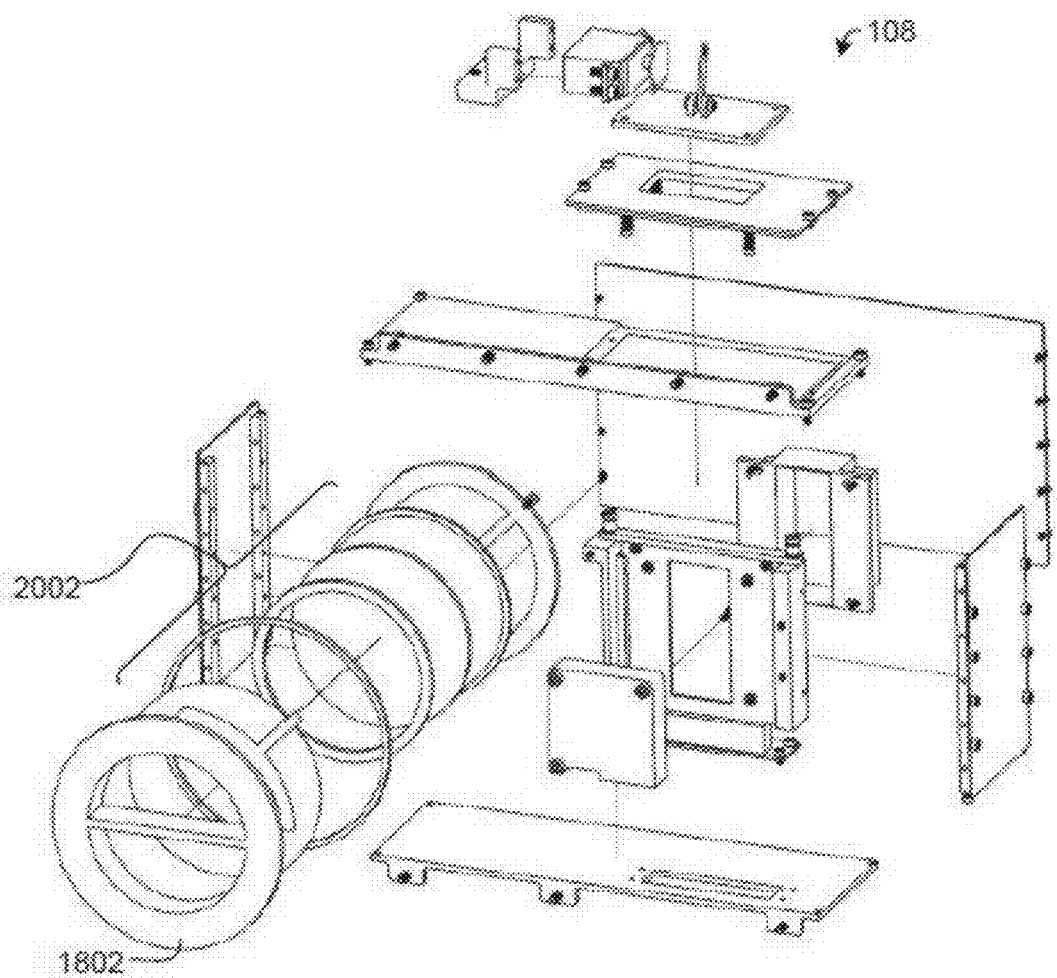
FIG. 5 is an exploded view of the environmental control unit of FIG. 3.

Referring now to FIGS. 3-5, various views of environmental control unit 108, according to various aspects of the present disclosure, are shown.

ECU 108 controls the internal environment of a device such as additive manufacturing device 100. In various aspects, ECU 108 includes temperature and humidity sensors, contaminant analysis units for detecting airborne toxic gases generated during part creation, devices for detecting and/or capturing errant pieces of feedstock, air circulating fans, heating elements, cooling elements, dehumidifiers, air filters and the like. ECU 108 may be configured to provide a controlled environment for the build volume of device 100. In some aspects, ECU 108 is configured to filter and control the environment inside device 100 such that when the surrounding environment is exposed to the internal environment, it is safe for user.

ECU 108 comprises a body 1808 which houses a series of removable filter elements. The filter elements make up a filter stack 2002 which may be accessed via filter release 1802. Body 1808 may also house one or more of the elements described above. ECU 108 may also comprise a vent motor 1804 connected to a vent 1806 for controlling air flow within ECU 108.

ECU 108 at, for example filter stack 2002, may comprise charcoal filters and high efficiency particulate air (HEPA) H14 filters. One or more grates may also be included in order to capture larger particles. The charcoal filters absorb volatiles that might be present in the AMF's production atmosphere, while the HEPA filters will remove 99.999% of all particulates in the air that are 0.3 microns or larger in size. In other aspects, other filters, grates or the like may be included which may filter nanoparticles, sub-micron sized particles, and other sized or types of particles which those skilled in the relevant art(s) wish to filter or control within device 100 or environments which device 100 is deployed within.

In some aspects ECU 108 runs one or more fans at a low, constant rate during part creation in order to ensure the interior of device 100 is uniform in temperature and to ensure that created portions of part adequately cool and cure.

In other aspects, ECU 108 may include cooling units, one or more thermal control units, one or more pumps, such as a vacuum pump, sources of gases (e.g., an argon gas sources inert gas source, such as argon gas; flammable gas; other gases or gas mixtures apparent to those skilled in the relevant art(s) after reading the description herein), a fire suppression system, a humidifier, and/or a source of biological agents (e.g., viruses, bacteria, and the like). In other aspects, an ionic air filter, UV light air filter, or other filter may be utilized. Air may be recirculated or otherwise moved via a diaphragm or other fanless device apparent to those skilled in the relevant art(s) after reading the description herein. In some aspects, ECU 108 functions outside in space and include one or more sources of gas such as a canister configured to emit gas and create a local environment or atmosphere.

In various aspects, ECU 108 is configured to capture outgassing, nanoparticles, and other potentially harmful material produced during the additive manufacturing process. For example, fused deposition molding processes produce potentially harmful gases during the build process. Additionally, nanoparticles of feedstock (e.g., ABS plastic) are produced. In a microgravity or other space environment, as well as in terrestrial locations, both the harmful gases and the nanoparticles may disperse throughout device 100 or the surrounding environment in an undesirable manner. ECU 108, or multiple ECUs, may be employed to filter or otherwise remove or contain such out gassing and nanoparticles.

Figure 6:
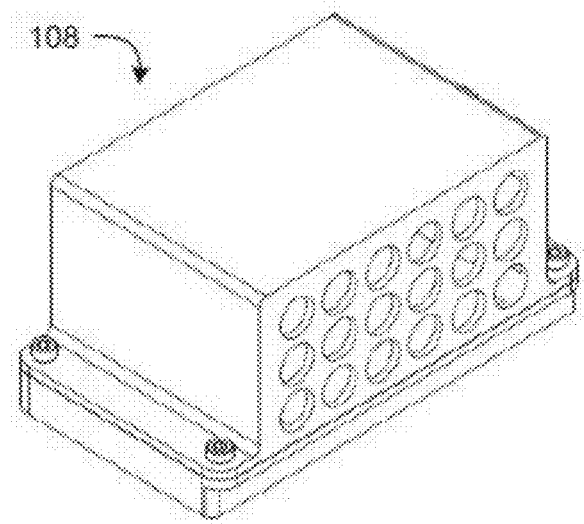
FIG. 6 is a perspective view of an environmental control unit configured to facilitate operation of an additive manufacturing device in an enclosed or controlled environment, according to various aspects of the present disclosure.
Figure 7:
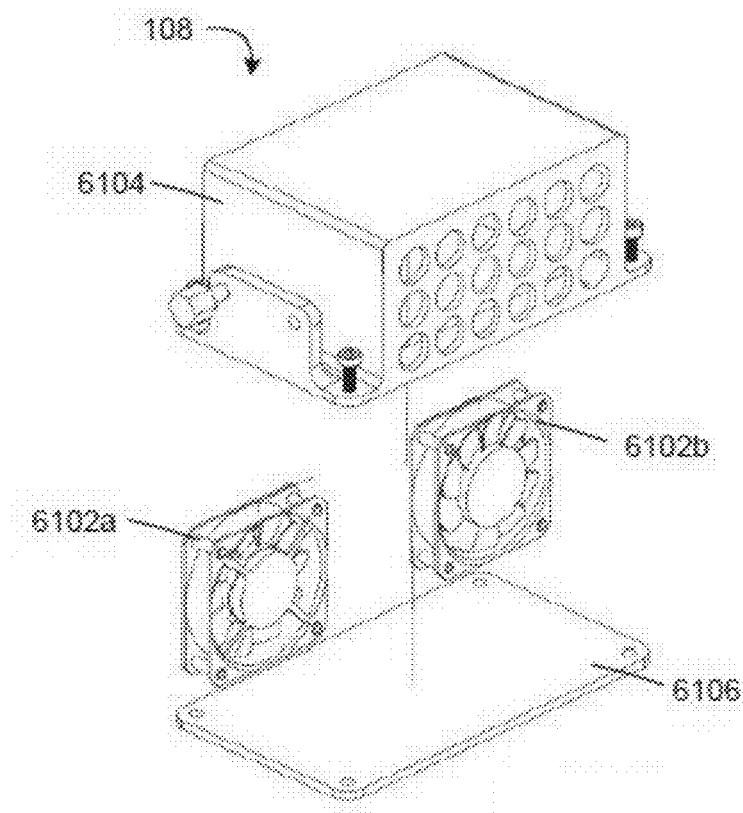
FIG. 7 is an exploded perspective view of the environmental control unit of FIG. 6.

Referring now to FIGS. 6-7, various views of environmental control unit 108 configured to facilitate operation of additive manufacturing device 100 in an enclosed or controlled environment, according to various aspects of the present disclosure, are shown. ECU may include ECU body 6104 housing a plurality of fans (labeled as fans 6102a-b in FIG. 7) and connecting to an ECU base plate 6106.

Referring now to FIGS. 8-13, various views of an environmental control unit configured to facilitate operation of an additive manufacturing device in an enclosed or controlled environment, the environmental control unit having a shutter assembly, according to various aspects of the present disclosure, are shown.

ECU 108 may include a shutter assembly 6204, housing 6302, a removable filter assembly 6202 retained by a latch 6208, multiple fans 6102 and air inlet cover 6502. Shutter assembly 6204 includes multiple physical shutters 6304 which are connected to shutter motor 6206 via shutter linkages 6306. Filter assembly 6202 may be a user replaceable component and include a carbon filter 6702 and a HEPA filter 6704.

Figure 14:
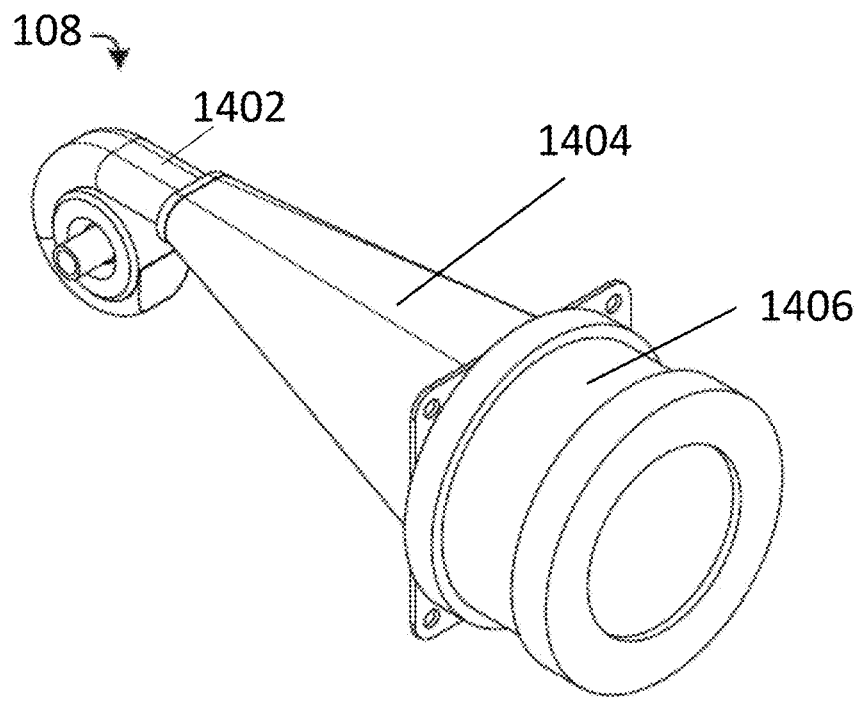
FIG. 14 is a perspective view of an environmental control unit using a centrifugal pump, according to various aspects of the present disclosure.

Referring now to FIGS. 14-17, various configurations of ECU 108 are shown. FIG. 14 shows ECU 108 using centrifugal pump 1402. Centrifugal pump 1402 connects to filter 1406 through duct 1404. In FIG. 14, air can enter centrifugal pump 1402 and exit through filter 1406, or air can enter filter 1406 and exit through centrifugal pump 1402.

Figure 15:
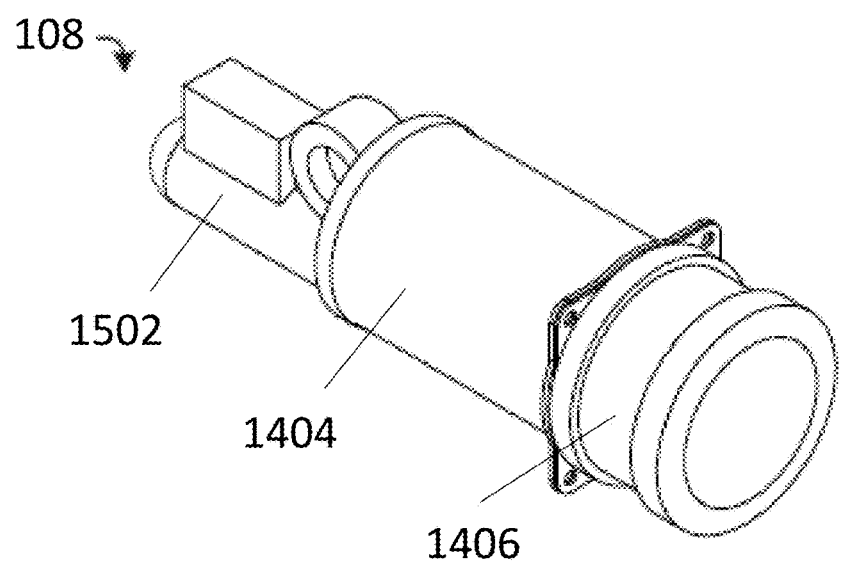
FIG. 15 is a perspective view of an environmental control unit using a compressor, according to various aspects of the present disclosure.

FIG. 15 shows ECU 108 using compressor 1502. Compressor 1502 connects to filter 1406 through duct 1404. In FIG. 15, air can enter compressor 1502 and exit through filter 1406, or air can enter filter 1406 and exit through compressor 1502.

Figure 16:
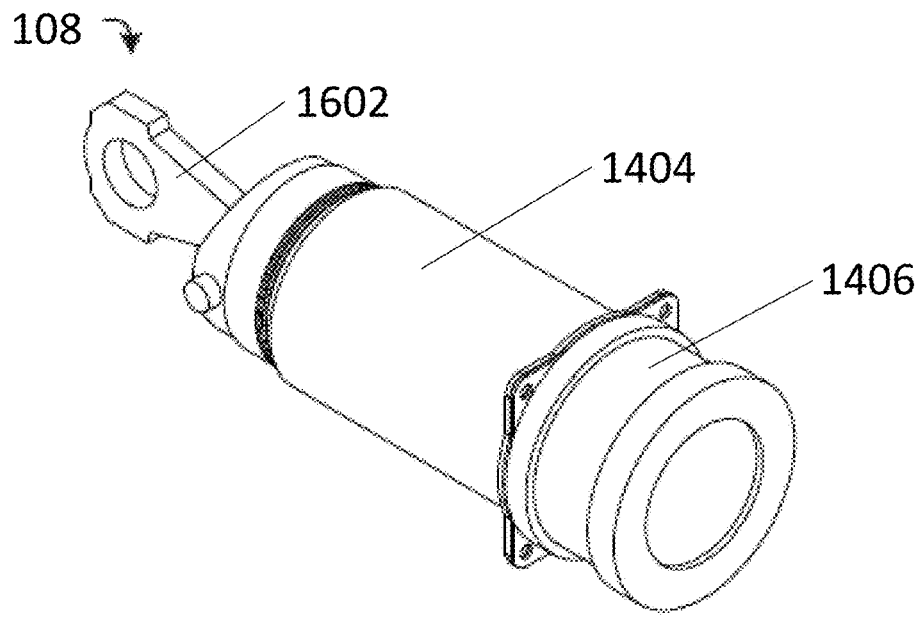
FIG. 16 is a perspective view of an environmental control unit using a piston, according to various aspects of the present disclosure.

FIG. 16 shows ECU 108 using piston 1602. Piston 1602 connects to filter 1406 through duct 1404. In FIG. 16, air can enter piston 1602 and exit through filter 1406, or air can enter filter 1406 and exit through piston 1602.

Figure 17:
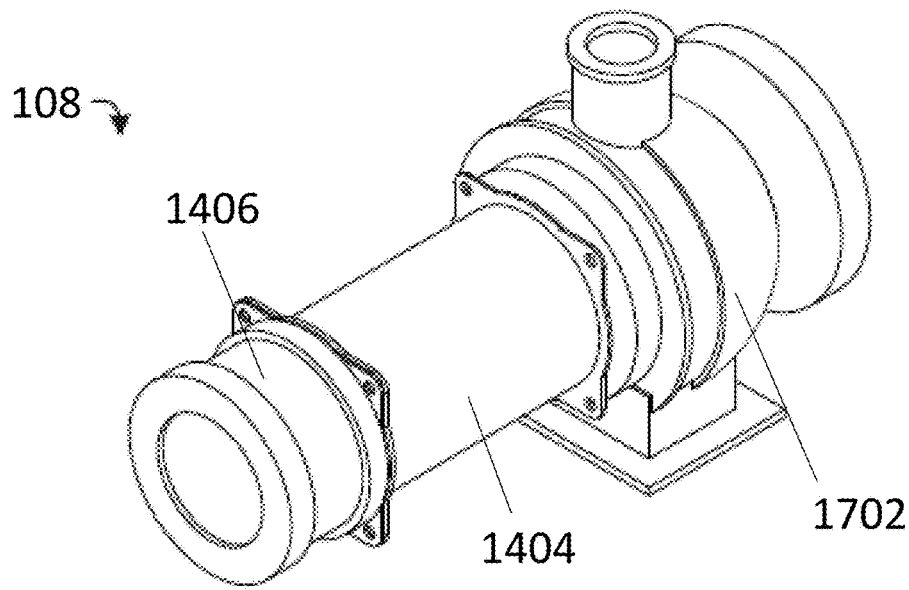
FIG. 17 is a perspective view of an environmental control unit using a pump, according to various aspects of the present disclosure.

FIG. 17 shows ECU 108 using pump 1702. Pump 1702 connects to filter 1406 through duct 1404. In FIG. 17, air can enter pump 1702 and exit through filter 1406, or air can enter filter 1406 and exit through pump 1702.

Figure 18:
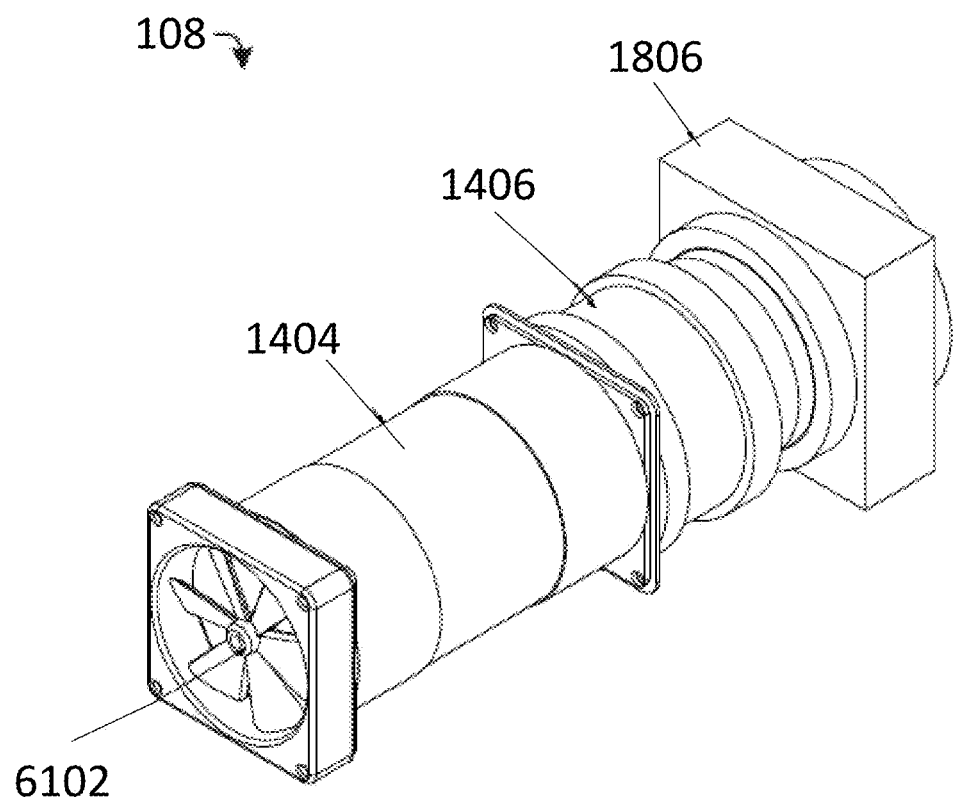
FIG. 18 is a perspective view of an environmental control unit incorporating a thermal control unit, according to various aspects of the present disclosure.
Figure 19:
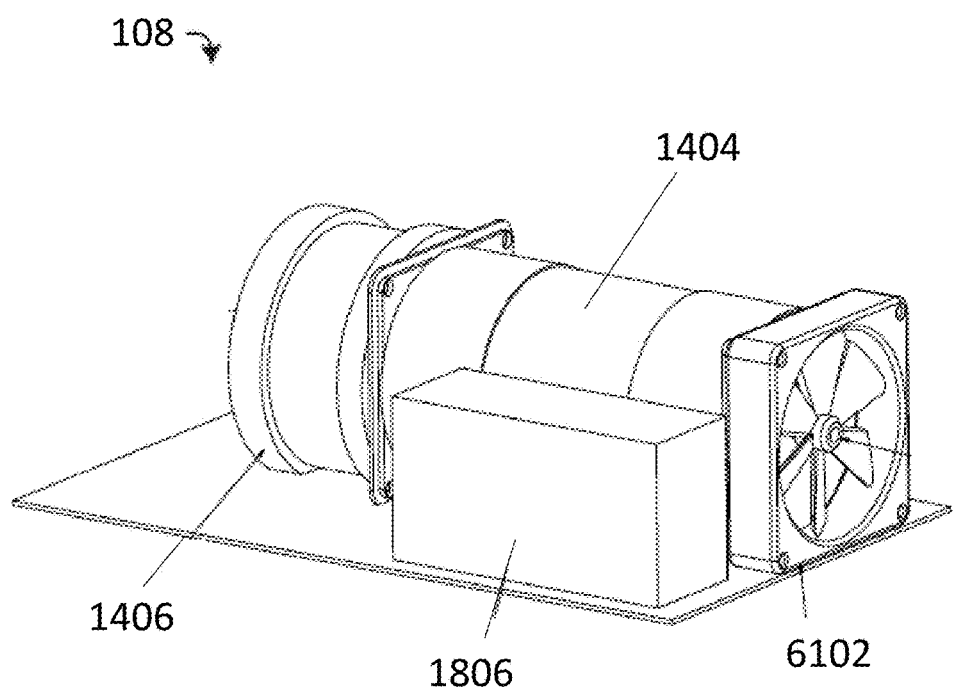
FIG. 19 is a perspective view of an environmental control unit incorporating a thermal control unit, according to various aspects of the present disclosure.

Referring now to FIGS. 18-19, various configurations of ECU 108 using thermal control unit 1806 are shown. FIG. 18 shows ECU 108 using fan 6102. Fan 6102 connects to filter 1406 using duct 1404. Filter 1406 connects to thermal control unit 1806. In FIG. 18, air enters fan 6102 and exits thermal control unit 1806.

FIG. 19 shows ECU 108 using fan 6102. Fan 6102 connects to filter 1406 using duct 1404. Thermal control unit 1806 contacts duct 1404. In FIG. 19, air enters fan 6102 and exits filter 1406.

Figure 20:
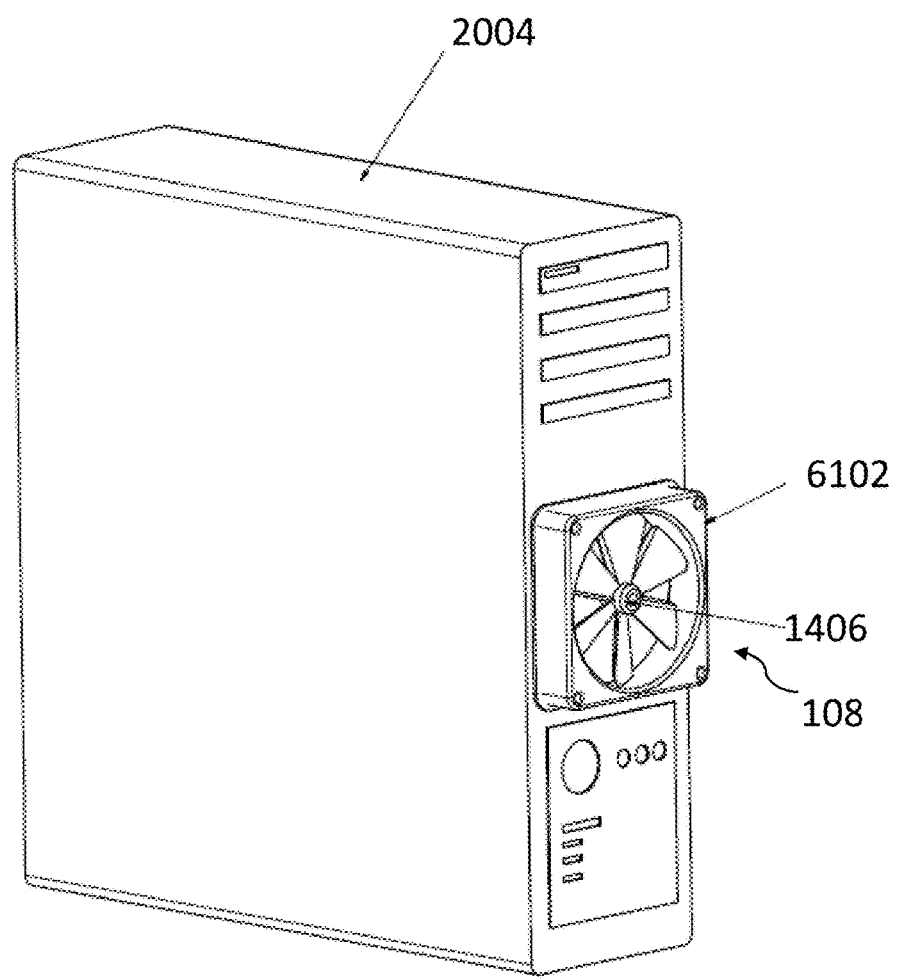
FIG. 20 is a perspective view of an environmental control unit inside of an electronic housing unit, according to various aspects of the present disclosure.

Referring now to FIG. 20, ECU 108 is shown inside electronics housing unit 2004. Fan 6102 and filter 1406 are shown protruding outside of the casing of electronics housing unit 2004.

Figure 21:
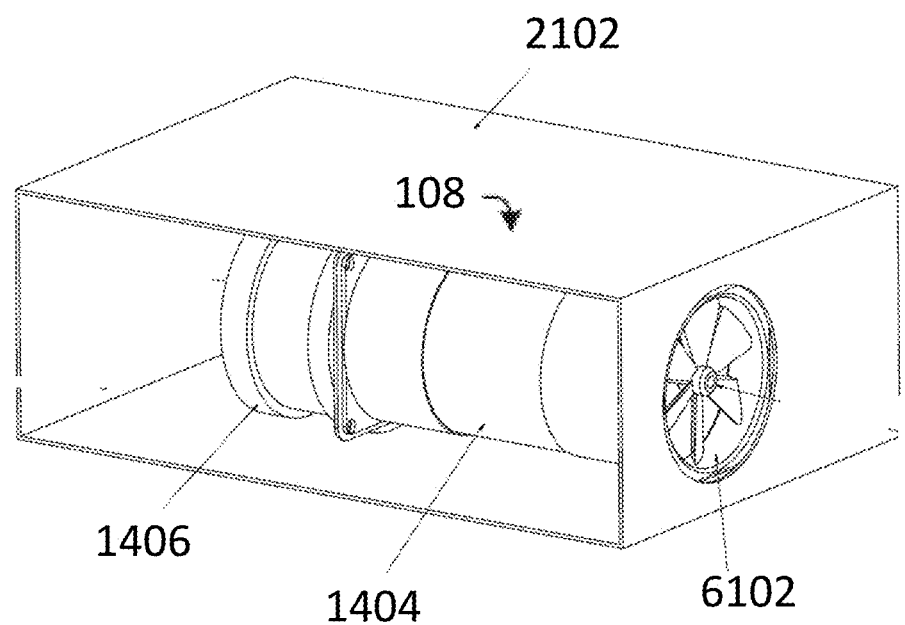
FIG. 21 is a perspective view of an environmental control unit in an encasing, according to various aspects of the present disclosure.
Figure 22:
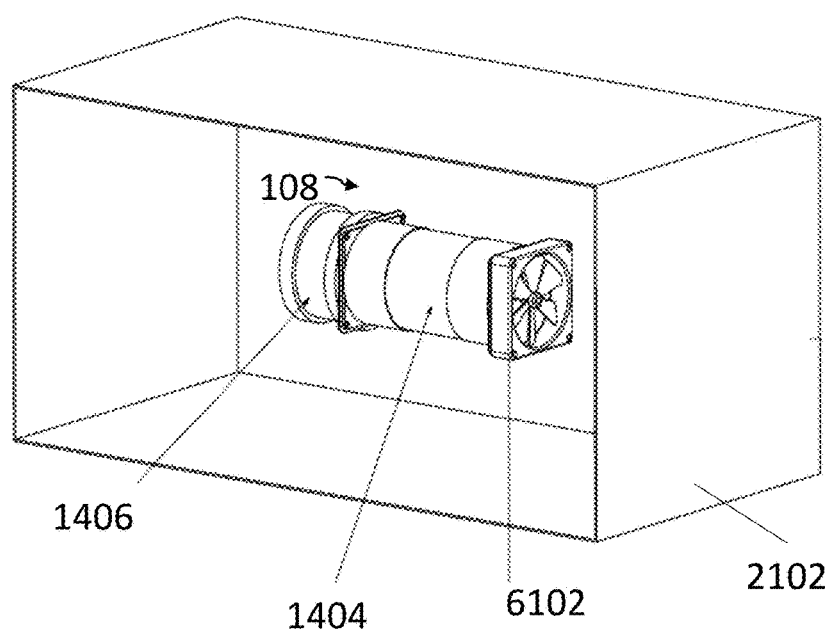
FIG. 22 is a perspective view of an encased environmental control unit, according to various aspects of the present disclosure.

Referring now to FIGS. 21-22, various views of ECU 108 in an encasing, according to various aspects of the present disclosure, are shown.

FIG. 21 shows ECU 108 with fan 6102 connected to duct 1404 and filter 1406 in encasing 2102. In ECU 108 in FIG. 21, air enters fan 6102 from outside encasing 2102 and exits filter 1406 and flows through encasing 2102. FIG. 21 shows a modular ECU which can be used with a number of different devices, such as an additive manufacturing device.

FIG. 22 shows a different configuration of ECU 108 in an encasing 2102. In ECU 108 in FIG. 22, air enters fan 6102 from within encasing 2102 and exits filter 1406 and flows through encasing 2102. FIG. 22 shows a modular ECU which can be used with a number of different devices, such as an additive manufacturing device.

Figure 23:
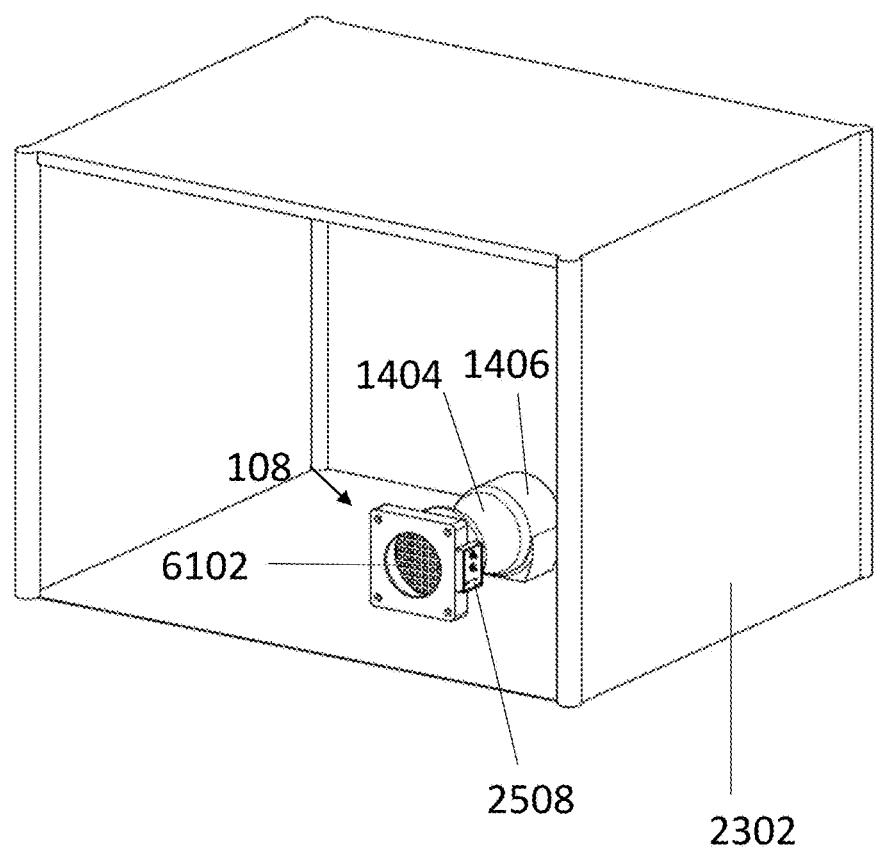
FIG. 23 is a perspective view of an environmental control unit in a tent, according to various aspects of the present disclosure.
Figure 24:
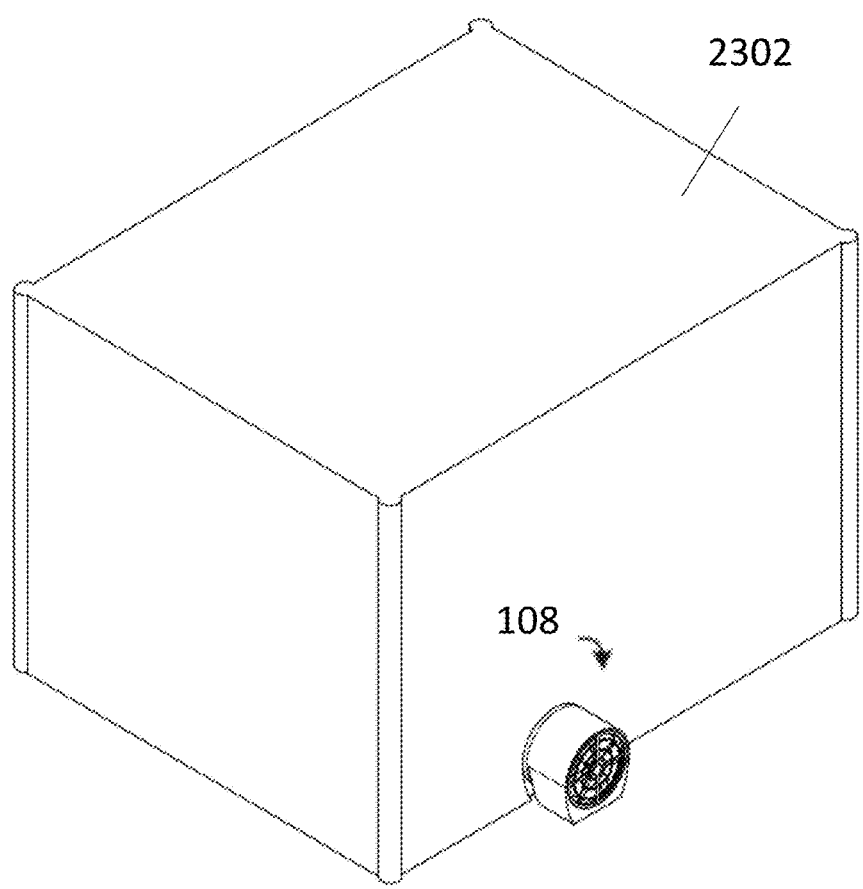
FIG. 24 is a perspective view of an environmental control unit partially outside of a tent, according to various aspects of the present disclosure.

Referring now to FIGS. 23-24, various views of ECU 108 in a tent, according to various aspects of the present disclosure, are shown.

FIG. 23 shows ECU 108 with fan 6102 connected to duct 1404 and filter 1406 in tent 2302. In FIG. 23, air enters fan 6102 from outside tent 2302 and exits filter 1406 and flows through tent 2302. Control unit 2508 is shown attached to fan 6102. Tent 2302 can be used to surround a number of different devices, such as an additive manufacturing device.

FIG. 24 shows a different configuration of ECU 108 in tent 2302.

Figure 25:
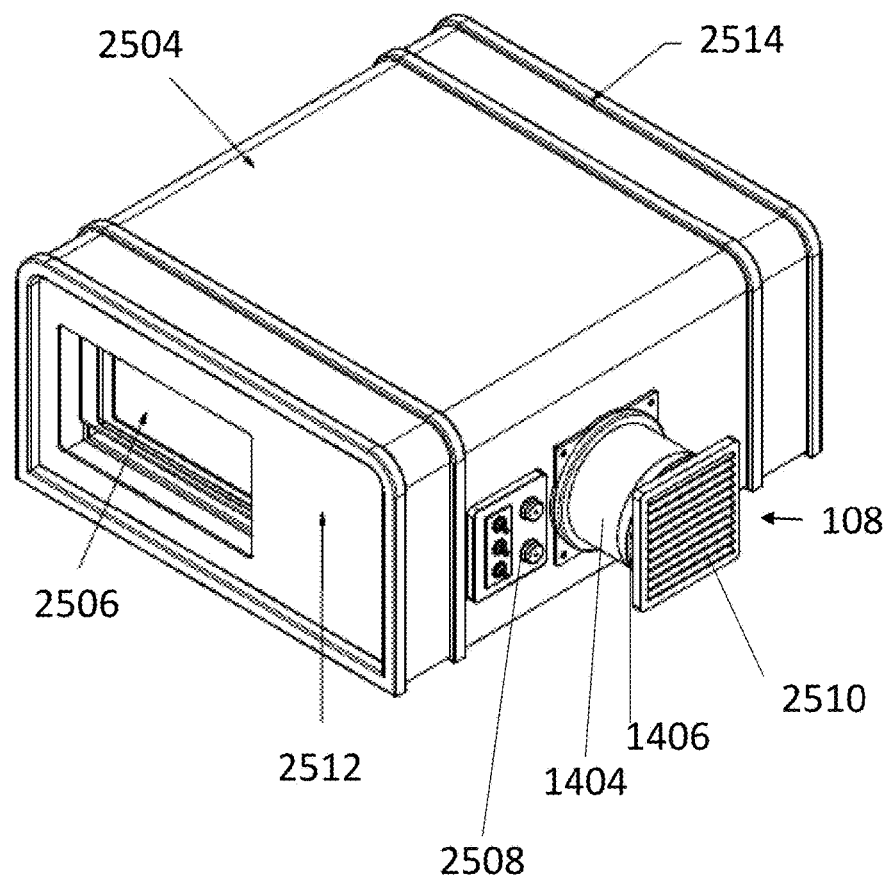
FIG. 25 is a perspective view of an environmental control unit and an additive manufacturing device inside a housing, according to various aspects of the present disclosure
Figure 26:
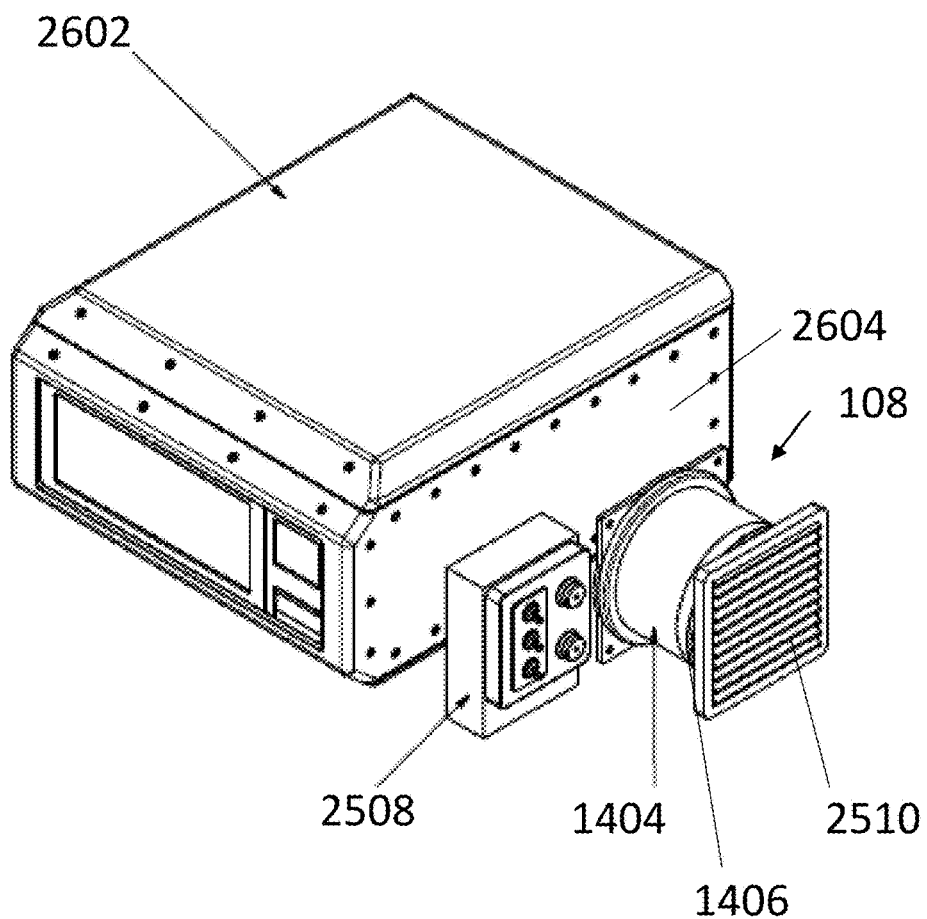
FIG. 26 is a perspective view of an environmental control unit and an additive manufacturing device, according to various aspects of the present disclosure

Referring now to FIGS. 25-26, various views of ECU 108 shown with an additive manufacturing device, according to various aspects of the present disclosure, are shown.

FIG. 25 shows ECU 108 outside of tent 1504. Tent support 2514 is shown. Tent 2504 also includes window 2506. Tent 2504 has removable front face 2512. Control unit 2508 is shown attached to tent 2504. Vent 2510 is attached to filter 1406. Filter 1406 is attached to vent 1404. FIG. 26 is an exploded view of control unit 2508 and ECU 108. FIG. 26 includes 3D printer 2602 attached to housing 2604.

Figure 27:
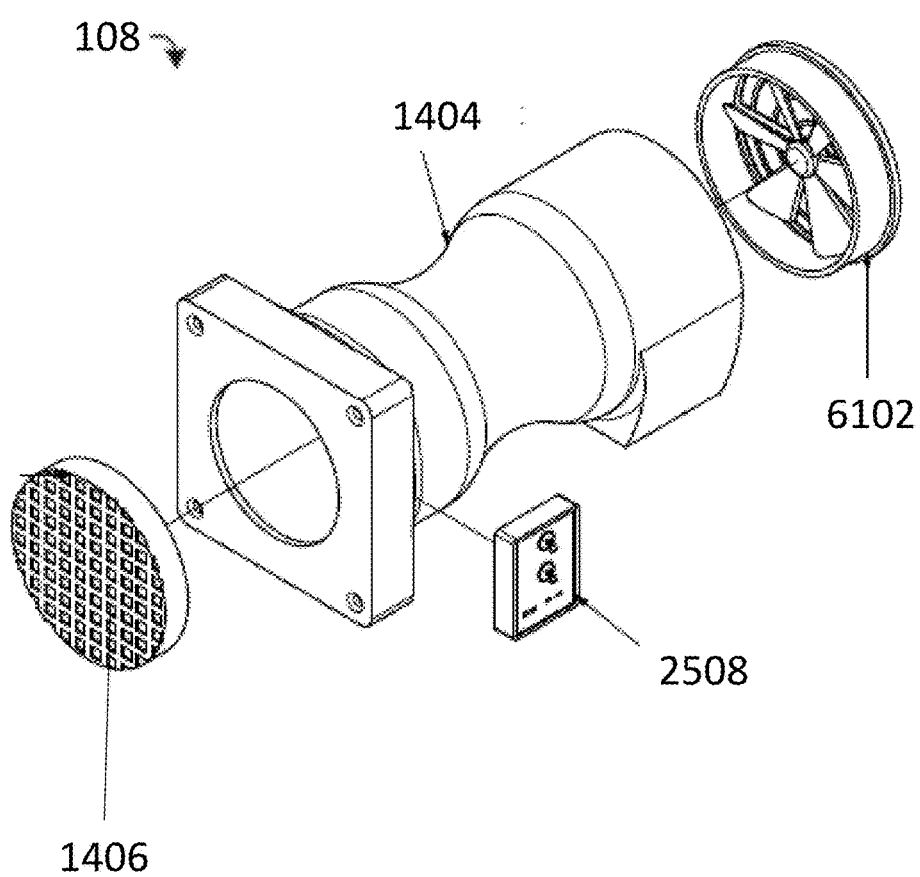
FIG. 27 is an exploded perspective view of an environmental control unit, according to various aspects of the present disclosure

Referring now to FIG. 27, an exploded view of ECU 108, according to aspects of the present disclosure, are shown. Filter 1406 is attached to duct 1404 and fan 6102. Control unit 2508 is shown attached to ECU 108.

Figure 28:
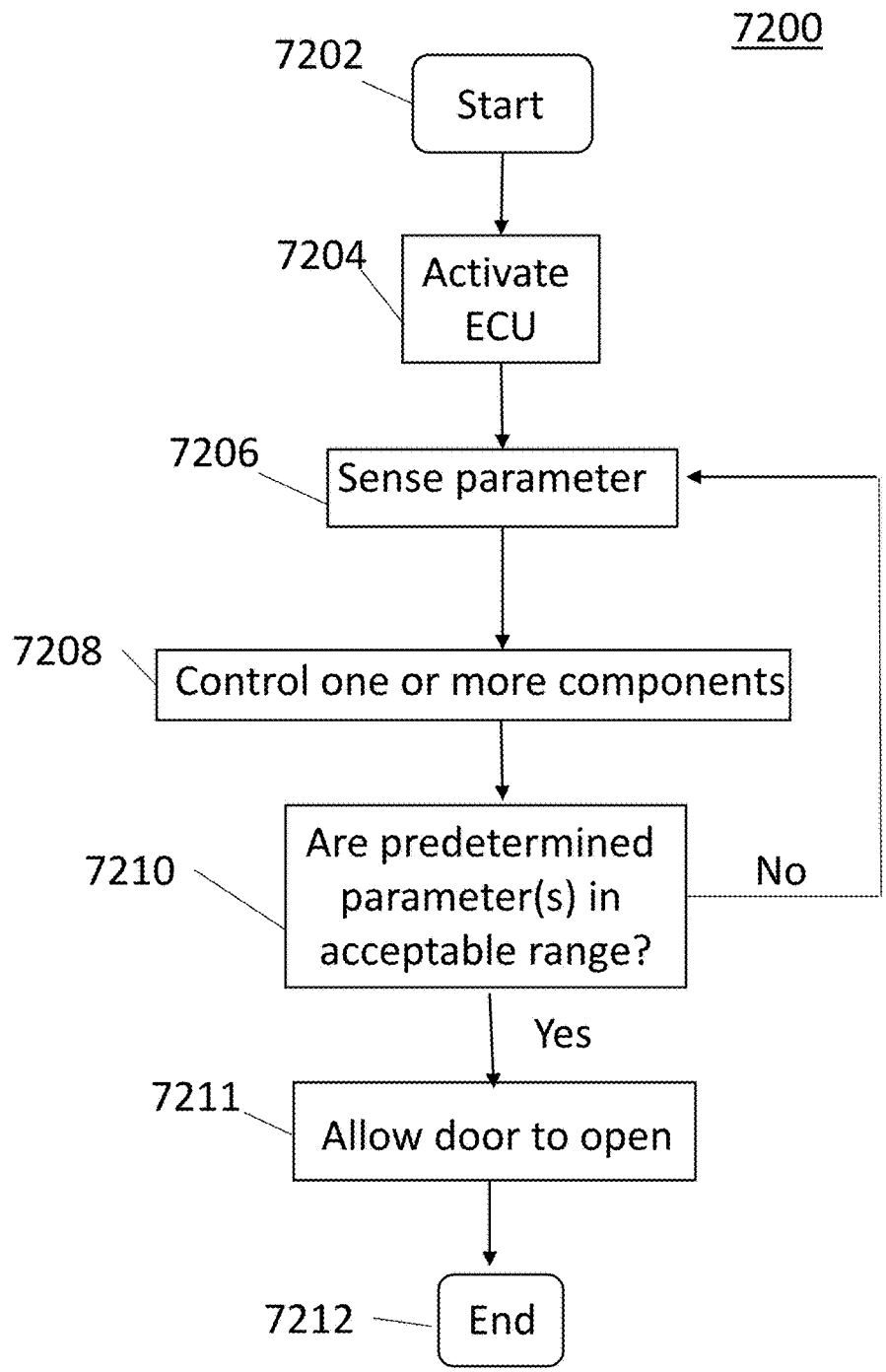
FIG. 28 is a flowchart depicting an exemplary process for using an environmental control unit to control the opening of an additive manufacturing device according to environmental conditions, according to aspects of the present disclosure.
Figure 30:
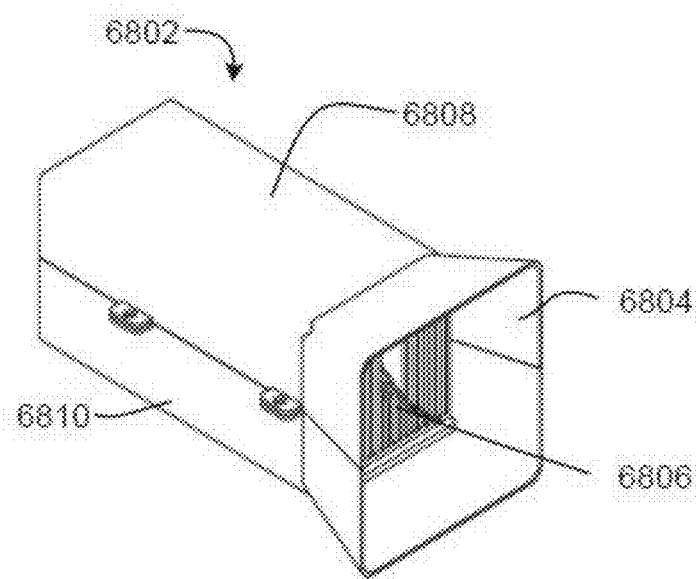
FIG. 30 is a perspective view of an air circulation and heating device for a device having an enclosed volume, according to various aspects of the present disclosure.
Figure 31:
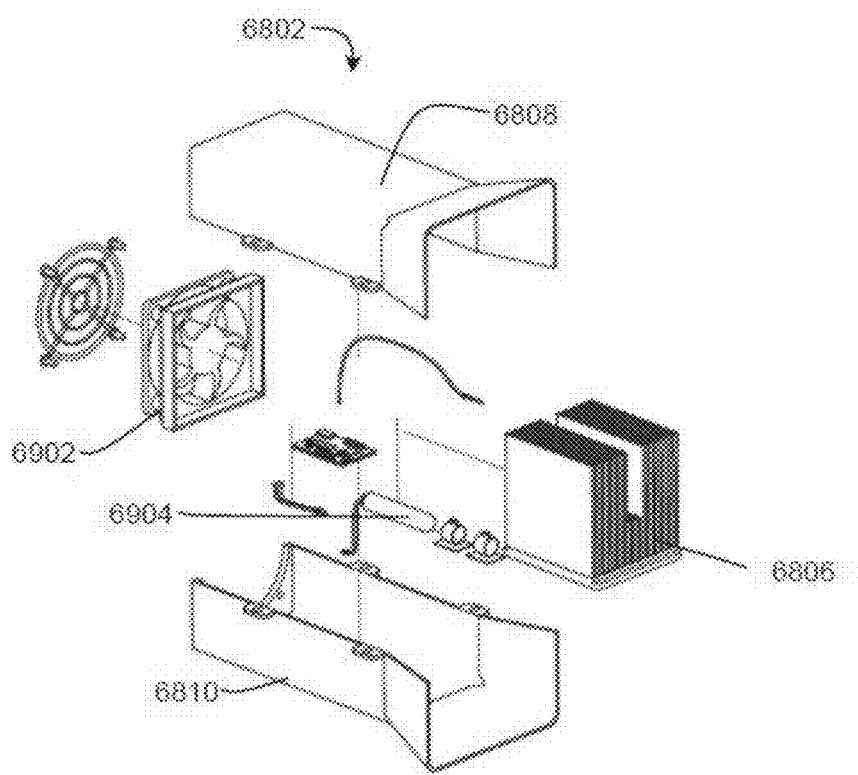
FIG. 31 is an exploded perspective view of the air circulation and heating device of FIG. 30.
Figure 32:
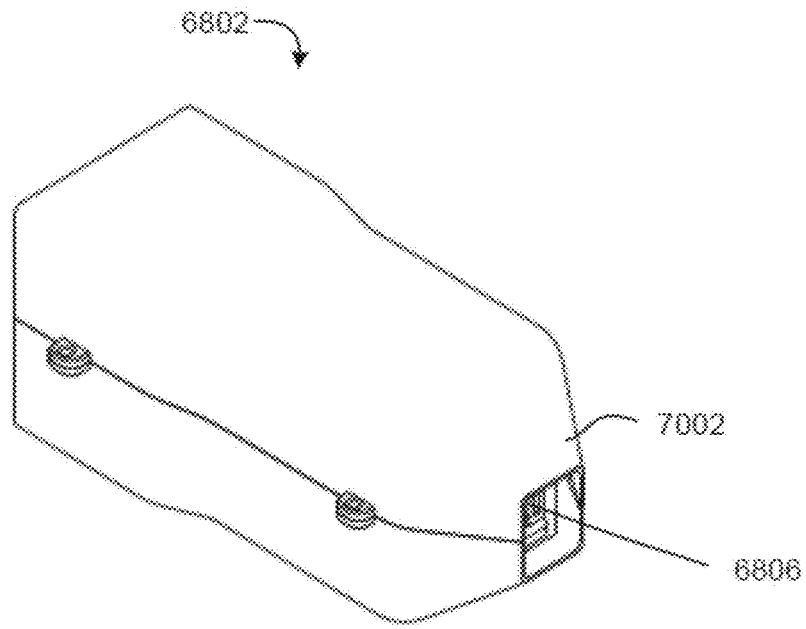
FIG. 32 is a perspective view of an air circulation and heating device having a narrowing end, according to various aspects of the present disclosure.

Referring now to FIG. 28, a flowchart depicting an exemplary process 7200 for using an environmental control unit to control the opening of an additive manufacturing device according to environmental conditions, according to aspects of the present disclosure, is shown.

Process 7200 begins at step 7202 with control immediately passing to step 7204.

At step 7204, the ECU connected to additive manufacturing device is activated.

At step 7206, the ECU sensors sense the environment of additive manufacturing device 100. At step 7208, one or more components of the ECU are controlled in response to the sensor readings. For example, if the temperature is not within specifications, the temperature control unit is activated to raise or lower the temperature inside device 100.

At step 7210, certain predetermined parameters are compared with the sensor readings. If the predetermined parameters are within the predetermined ranges, the door to device 100 is allowed to open in step 7211. If the predetermined parameters are not within the predetermined ranges, the process returns to step 7206 and continues until the predetermined parameters are within the predetermined ranges.

Process 7200 then terminates at step 7212.

Referring now to FIG. 29, a block diagram illustrating an exemplary computer system 7300 useful for implementing an aspect of the present disclosure, is shown.

FIG. 29 sets forth an illustrative computer system that may be used to implement computing functionality 7300, such as control unit 2508, which in all cases represents one or more physical and tangible processing mechanisms.

Computing functionality 7300 may comprise volatile and non-volatile memory, such as RAM 7302 and ROM 7304, as well as one or more processing devices 7306 (e.g., one or more central processing units (CPUs), one or more graphical processing units (GPUs), and the like). Computing functionality 7300 also optionally comprises various media devices 7308, such as a hard disk module, an optical disk module and so forth. Computing functionality 7300 may perform various operations identified above when the processing device(s) 7306 execute(s) instructions that are maintained by memory (e.g. RAM 7302, ROM 7304, and the like).

More generally, instructions and other information may be stored on any computer readable medium 7310, including, but not limited to, static memory storage devices, magnetic storage devices and optical storage devices. The term "computer readable medium" also encompasses plural storage devices. In all cases, computer readable medium 7310 represents some form of physical and tangible entity. By way of example, and not limitation, computer readable medium 7310 may comprise "computer storage media" and "communications media."

"Computer storage media" comprises volatile and non-volatile, removable and non-removable media implemented in any method or technology for storage of information, such as computer readable instructions, data structures, program modules, or other data. Computer storage media may be, for example, and not limitation, RAM 7302, ROM 7304, EEPROM, Flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. Communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared, and other wireless media. Combinations of any of the above are also included within the scope of computer readable medium.

Computing functionality 7300 may also comprise an input/output module 7312 for receiving various inputs (via input modules 7314), and for providing various outputs (via one or more output modules). One particular output module mechanism may be a presentation module 7316 and an associated GUI 7318. Computing functionality 7300 may also include one or more network interfaces 7320 for exchanging data with other devices via one or more communication conduits 7322. In some embodiments, one or more communication buses 7324 communicatively couple the above-described components together.

Communication conduit(s) 7322 may be implemented in any manner (e.g., by a local area network, a wide area network (e.g., the Internet), and the like, or any combination thereof). Communication conduit(s) 7322 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The terms "module" and "component" as used herein generally represent software, firmware, hardware, or combinations thereof. In the case of a software implementation, the module or component represents program code that performs specified tasks when executed on a processor. The program code may be stored in one or more computer readable memory devices. The features of the present disclosure described herein are platform-independent, meaning that the techniques can be implemented on a variety of commercial computing platforms having a variety of processors (e.g., set-top box, desktop, laptop, notebook, tablet computer, personal digital assistant (PDA), mobile telephone, smart telephone and the like).

Referring now to FIGS. 30-33, various views and aspects of an air circulation and heating device 6802 for a device having an enclosed volume, according to various aspects of the present disclosure, are shown. Air circulation and heating device 6802 may be used in conjunction with ECU 108, according to aspects of the present disclosure.

In some aspects, air circulation and temperature control of ECU 108 may be facilitated by or augmented by device 6802. Device 6802 includes a radiator 6806 connected to a heating element 6904 for heating air that passes through device 6802. Fan 6902 may be used to force air through device 6802. The body of device 6802 is created from a top portion 6808 and a lower portion 6810. The body of device 6802 may include enclosure 6804 to direct air.

Figure 33:
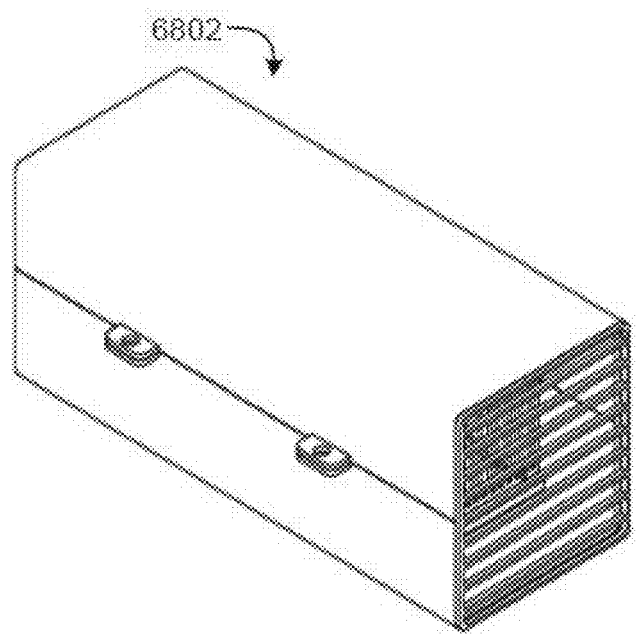
FIG. 33 is a perspective view of a rectangular air circulation and heating device, according to various aspects of the present disclosure.

End portions of device 6802 may be flared (as in FIG. 30) narrowing (as in element 7002 in FIG. 32) or device 6802 may be rectangular (as in FIG. 33).

While various aspects of the present disclosure have been described herein, it should be understood that they have been presented by way of example and not limitation. It will be apparent to persons skilled in the relevant art(s) that various changes in form and detail can be made therein without departing from the spirit and scope of the present disclosure.

Thus, the present disclosure should not be limited by any of the above described exemplary aspects, but should be defined only in accordance with the following claims and their equivalents.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures (e.g., utilizing additive manufacturing devices not mentioned herein, implementation within computing devices other than those disclosed herein, and operating in environments other than those disclosed herein). As will be appreciated by those skilled in the relevant art(s) after reading the description herein, certain features from different aspects of the systems, methods and computer program products of the present disclosure may be combined to form yet new aspects of the present disclosure.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. An extrusion-based additive manufacturing device comprising an environmental control unit, the environmental control unit comprising:
    at least one filter within an enclosed additive manufacturing build volume to capture at least one of volatile organic compounds and nanoparticles generated by operation of the additive manufacturing device;
    an air handler configured to drive atmosphere contained within the build volume of the additive manufacturing device through the at least one filter;
    a temperature control device;
    at least one sensor; and
    a control unit in electrical communication with the air handler, the temperature control device and a sensor.

2. The additive manufacturing device of claim 1, further comprising a prefilter in circulation communication with the air handler.

3. The additive manufacturing device of claim 1, wherein the temperature control device is a cooler or heater.

4. The additive manufacturing device of claim 1, wherein a filter is a HEPA filter.

5. The additive manufacturing device of claim 1, wherein a sensor is one or more of: a particle counter; a thermometer; a humidity sensor; an air pressure sensor; a chemical sensor; and an air velocity sensor.

6. The additive manufacturing device of claim 1, wherein the air handler is one or more of: a centrifugal pump; a compressor; a piston; a pump; a fan; a vent motor and vent; a shutter; a temperature differential mover; and a blower.

7. An additive manufacturing device environmental control unit adapted to capture an emission generated from additive manufacturing, the environmental control unit comprising:
    an air handler to drive atmosphere within an enclosed build volume;
    at least one filter, located within the enclosed build volume, in circulation communication with the air handler;

a temperature control device;
at least one sensor; and
a control unit in electrical communication with the air handler, the temperature control device and the at least one sensor.

8. The environmental control unit of claim 7, wherein the environmental control unit is positioned either within an airtight additive manufacturing device build volume or in circulation communication with an airtight additive manufacturing device build volume.

9. The environmental control unit of claim 7, wherein the emission is one or more of: a thermopolymer particle; a nanoparticle; a metal particle; a composite particle; a hydrocarbon; a VOC; and a gas.

10. The environmental control unit of claim 7, wherein the emission is nanoparticles generated by operation of an extrusion-based additive manufacturing device.

11. The environmental control unit of claim 7, wherein the sensor is one or more of: a particle counter; a thermometer; a humidity sensor; an air pressure sensor; a chemical sensor; and an air velocity sensor.

12. The environmental control unit of claim 7, wherein a filter is replaceable by hand from within or outside the additive manufacturing device.

13. The environmental control unit of claim 7, wherein the filter is one or more of: carbon; HEPA; doped HEPA; doped carbon; activated charcoal; UPLA; an electrostatic precipitator; and an air ionizer.

14. The environmental control unit of claim 7, further comprising a prefilter in circulation communication with the air handler.

15. The environmental control unit of claim 7, wherein the prefilter is one of: a cyclonic separator; a grate; a shutter; and an ionic filter.

16. The environmental control unit of claim 7, wherein the air handler is one or more of: a centrifugal pump; a compressor; a piston; a pump; a fan; a vent motor and vent; a shutter; a temperature differential mover; and a blower.

17. The environmental control unit of claim 7, wherein the temperature control device is a cooler or heater.

18. A method of capturing a nanoparticle generated by operation of an extrusion-based additive manufacturing device, the method comprising:
providing an environmental control unit comprising:
an air handler;
a filter, located within a build volume of the additive manufacturing device, in circulation communication with the air handler;
a temperature control device;
one or more sensors; and
a control unit in electrical communication with the air handler, the temperature control device and the one or more sensors;
either
drawing air front the additive manufacturing device construction volume into the air handler, which air handler is adapted to direct the air into the filter; or
drawing air from outside the additive manufacturing device construction volume into the air handler, which air handler is adapted to direct the air into the filter;
sensing with a sensor one or more of: the temperature inside the additive manufacturing device construction volume; the humidity inside the additive manufacturing device construction volume; the number of particles inside the additive manufacturing device construction volume; the composition of particles inside the additive manufacturing device construction volume; the composition of the air environment inside the additive manufacturing device construction volume; and the amount of air circulating inside the additive manufacturing device construction volume;
controlling with the control unit one or more of: the temperature inside the additive manufacturing device construction volume; the amount of air flowing through the air handler; and the time the air is drawn into the air handler; and
either
returning the air to the additive manufacturing device construction volume; or
expelling the air from the additive manufacturing device construction volume.

19. The method of claim 18, wherein the temperature control device is a cooler or heater.

20. The method of claim 18, wherein the air handler is one or more of: a centrifugal pump; a compressor; a piston; a pump; a fan; a vent motor and vent; a shutter; a temperature differential mover; and a blower; and the filter is one or more of: carbon; HEPA; doped HEPA; doped carbon; activated charcoal; UPLA; an electrostatic precipitator; and an air ionizer.

21. The additive manufacturing device of claim 1, wherein the at least one filter is removable from within the build volume of the additive manufacturing device.

* * * * *